(12) United States Patent
Takahashi et al.

(10) Patent No.: US 11,810,386 B2
(45) Date of Patent: Nov. 7, 2023

(54) IMAGE CAPTURE APPARATUS AND CONTROL METHOD

(71) Applicant: CANON KABUSHIKI KAISHA, Tokyo (JP)

(72) Inventors: Hayato Takahashi, Kanagawa (JP); Kazunori Takayama, Tokyo (JP); Soichiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 17/316,379

(22) Filed: May 10, 2021

(65) Prior Publication Data

US 2021/0357631 A1    Nov. 18, 2021

(30) Foreign Application Priority Data

May 18, 2020   (JP) ................. 2020-086426

(51) Int. Cl.

| | |
|---|---|
| *G06V 40/10* | (2022.01) |
| *H04N 23/69* | (2023.01) |
| *H04N 23/661* | (2023.01) |
| *G06V 20/13* | (2022.01) |
| *G06V 20/17* | (2022.01) |
| *G06V 20/52* | (2022.01) |

(52) U.S. Cl.
CPC .............. *G06V 40/10* (2022.01); *G06V 20/13* (2022.01); *G06V 20/17* (2022.01); *G06V 20/52* (2022.01); *G06V 40/103* (2022.01); *H04N 23/661* (2023.01); *H04N 23/69* (2023.01)

(58) Field of Classification Search
CPC ...... G06V 40/103; G06V 20/13; G06V 20/17; G06V 20/52; G06V 40/10; H04N 5/23206; H04N 5/23296; H04N 5/23219; H04N 5/23245; H04N 5/23299; H04N 5/247
USPC ........................................ 382/103
See application file for complete search history.

(56) References Cited

U.S. PATENT DOCUMENTS

| | | | | |
|---|---|---|---|---|
| 2004/0252194 A1* | 12/2004 | Lin | ......... | H04N 7/181 |
| | | | | 348/E7.086 |
| 2006/0126738 A1* | 6/2006 | Boice | ............ | G01S 3/7862 |
| | | | | 348/E7.086 |
| 2011/0069173 A1* | 3/2011 | Hazzani | ........... | G08B 13/19658 |
| | | | | 348/E7.085 |
| 2017/0301109 A1* | 10/2017 | Chan | ......... | G06T 7/73 |

FOREIGN PATENT DOCUMENTS

JP        2015015559 A     1/2015

* cited by examiner

*Primary Examiner* — Stephen P Coleman
(74) *Attorney, Agent, or Firm* — Canon U.S.A., Inc., IP Division

(57) ABSTRACT

An image capture apparatus includes an image capture unit, a communication unit that receives subject information about a subject captured by an external apparatus, and a control unit that controls the image capture apparatus based on a first operation mode in a case where the subject information does not include information about a main subject, or based on a second operation mode in a case where the subject information includes the information about the main subject. The first operation mode is an operation mode of searching for the main subject, and the second operation mode is an operation mode of capturing an image of the subject at an angle of view that is different from an angle of view of the external apparatus.

14 Claims, 14 Drawing Sheets

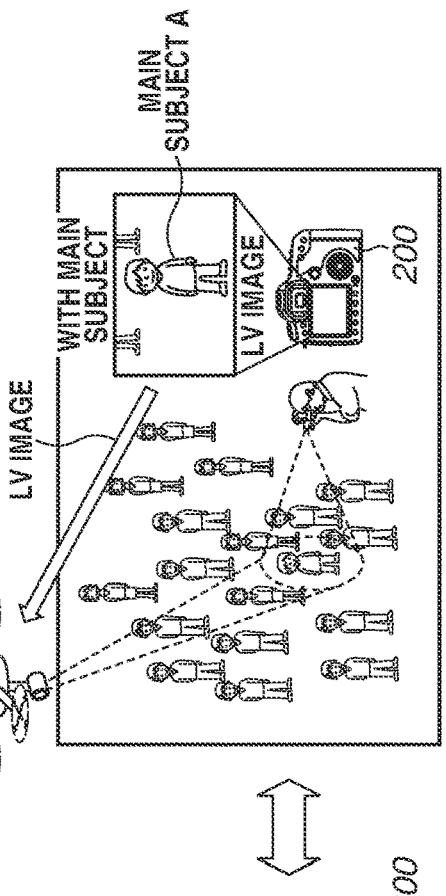
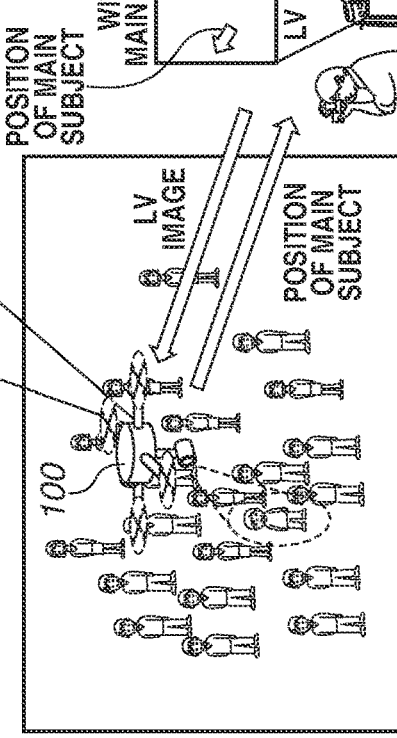
FIG. 4A FIRST OPERATION MODE
FIG. 4B SECOND OPERATION MODE

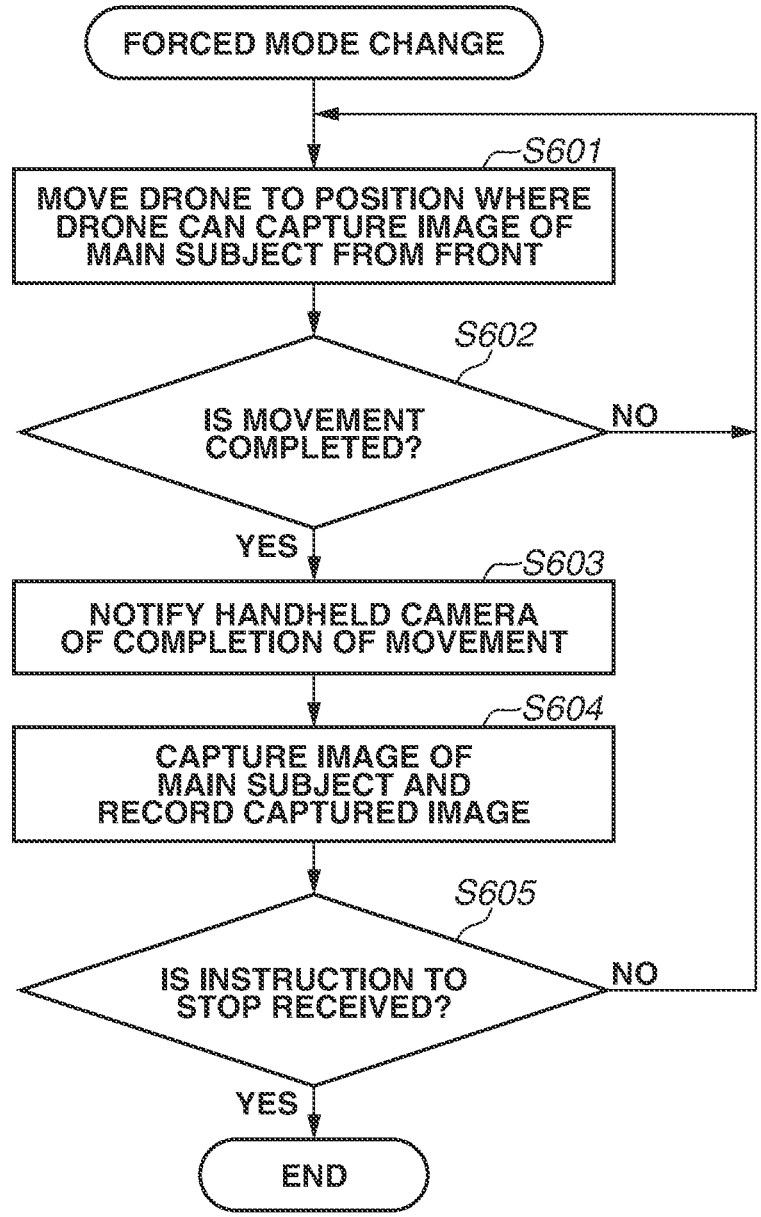

IMAGE CAPTURED BY DRONE 100

DETECTED MOTION VECTORS OF SUBJECTS
AND IMAGE DIVIDED INTO FOUR REGIONS

FIG.7C
DETAILS OF DETECTED MOTION VECTORS

| ID | COORDINATE | BEFORE MOVEMENT | AFTER MOVEMENT | REGION | MOVEMENT AMOUNT | ABSOLUTE VALUE OF AVERAGE OF MOVEMENT AMOUNTS | |
|---|---|---|---|---|---|---|---|
| | | | | | | HORIZONTAL | VERTICAL |
| ID800 | HORIZONTAL COORDINATE | 500 | 300 | 1 | -200 | 137 | 70 |
| | VERTICAL COORDINATE | 100 | 90 | | -10 | | |
| ID801 | HORIZONTAL COORDINATE | 290 | 260 | 1 | -30 | | |
| | VERTICAL COORDINATE | 300 | 250 | | -50 | | |
| ID802 | HORIZONTAL COORDINATE | 200 | 210 | 1 | 10 | | |
| | VERTICAL COORDINATE | 350 | 260 | | -90 | | |
| ID803 | HORIZONTAL COORDINATE | 400 | 350 | 1 | -50 | | |
| | VERTICAL COORDINATE | 500 | 370 | | -130 | | |
| ID804 | HORIZONTAL COORDINATE | 900 | 600 | 1 | -300 | | |
| | VERTICAL COORDINATE | 250 | 250 | | 0 | | |
| ID805 | HORIZONTAL COORDINATE | 700 | 450 | 1 | -250 | | |
| | VERTICAL COORDINATE | 500 | 360 | | -140 | | |
| ID806 | HORIZONTAL COORDINATE | 400 | 350 | 2 | -50 | 15 | 25 |
| | VERTICAL COORDINATE | 800 | 800 | | 0 | | |
| ID807 | HORIZONTAL COORDINATE | 850 | 930 | 2 | 80 | | |
| | VERTICAL COORDINATE | 850 | 800 | | -50 | | |
| ID808 | HORIZONTAL COORDINATE | 1200 | 1300 | 4 | 100 | 28 | 10 |
| | VERTICAL COORDINATE | 80 | 30 | | -50 | | |
| ID809 | HORIZONTAL COORDINATE | 1400 | 1250 | 4 | -150 | | |
| | VERTICAL COORDINATE | 360 | 350 | | -10 | | |
| ID810 | HORIZONTAL COORDINATE | 1050 | 1200 | 4 | 150 | | |
| | VERTICAL COORDINATE | 490 | 490 | | 0 | | |
| ID811 | HORIZONTAL COORDINATE | 1600 | 1610 | 4 | 10 | | |
| | VERTICAL COORDINATE | 200 | 300 | | 100 | | |
| ID812 | HORIZONTAL COORDINATE | 1050 | 1150 | 3 | 100 | 43 | 17 |
| | VERTICAL COORDINATE | 850 | 1000 | | 150 | | |
| ID813 | HORIZONTAL COORDINATE | 1250 | 1400 | 3 | 150 | | |
| | VERTICAL COORDINATE | 800 | 700 | | -100 | | |
| ID814 | HORIZONTAL COORDINATE | 1470 | 1350 | 3 | -120 | | |
| | VERTICAL COORDINATE | 800 | 800 | | 0 | | |

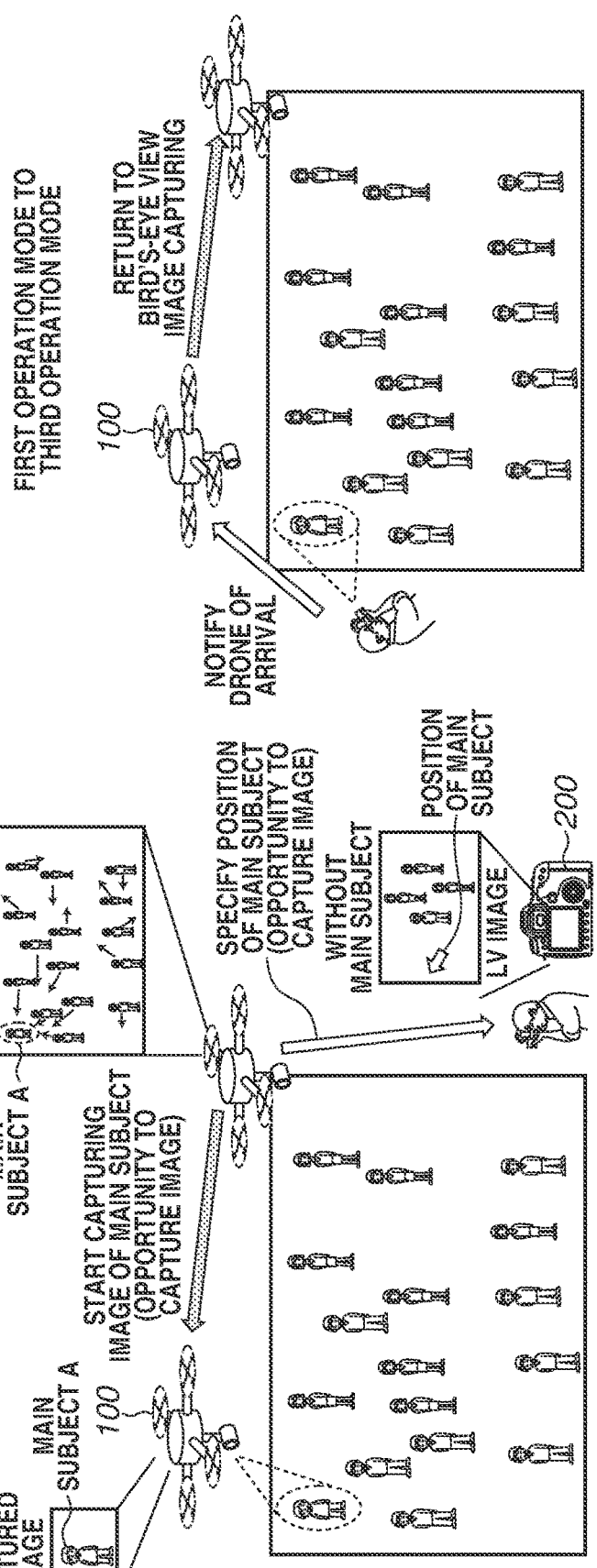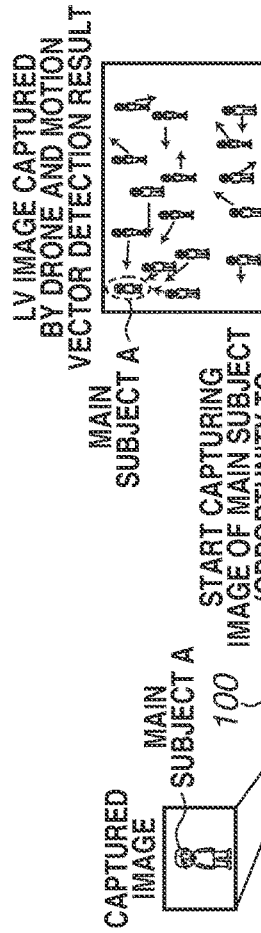
FIG.8A
THIRD OPERATION MODE TO FIRST OPERATION MODE
FIG.8B
FIRST OPERATION MODE TO THIRD OPERATION MODE

IMAGE CAPTURE APPARATUS AND CONTROL METHOD

BACKGROUND

Field of the Disclosure

Aspects of the disclosure generally relate to an image capture apparatus with a changeable shooting angle of view, a method of controlling the same, and a storage medium that stores a program relating thereto.

Description of the Related Art

Image capture systems that capture subject images using cameras (image capture apparatuses) are known. In the image capture systems, orientations and image capturing of all cameras are generally controlled by a person manually. However, in a case where images of fast-moving subjects are to be captured, it is difficult for a person to manually control all the cameras and capture images.

An image capture system that overcomes the above-described issue is known. Specifically, the image capture system includes cameras, and the cameras share information and cooperate to automatically capture subject images. For example, Japanese Patent Application Laid-Open No. 2015-15559 discusses a system in which subject information detected by a parent camera is transmitted to a child camera and the child camera determines an image capture timing based on the transmitted information. This realizes simultaneous image capturing for a specific subject from desired directions by cameras.

With the configuration discussed in Japanese Patent Application Laid-Open No. 2015-15559, however, since the image capture timing of the child camera is controlled based on the subject information detected by the parent camera, all the cameras are unable to capture an image of the subject in a case where the parent camera loses sight of the subject. Furthermore, the child camera is automatically controlled only during the time the parent camera is capturing an image of the subject.

SUMMARY

According to an aspect of the embodiments, in a case where an image capture apparatus loses sight of a subject and is no longer able to capture an image of the subject, another image capture apparatus can capture an image of the subject.

According to an aspect of the embodiments, there is provided an image capture apparatus that includes an image capture unit, a communication unit that receives subject information about a subject captured by an external apparatus, and a control unit that controls the image capture apparatus based on a first operation mode in a case where the subject information does not include information about a main subject, or based on a second operation mode in a case where the subject information includes the information about the main subject. The first operation mode is an operation mode of searching for the main subject, and the second operation mode is an operation mode of capturing an image of the subject at an angle of view that is different from an angle of view of the external apparatus.

According to an aspect of the embodiments, there is provided a method that includes receiving subject information about a subject captured by an external apparatus, and controlling the image capture apparatus based on a first operation mode in a case where the subject information does not include information about a main subject, or based on a second operation mode in a case where the subject information includes the information about the main subject. The first operation mode is an operation mode of searching for the main subject, and the second operation mode is an operation mode of capturing an image of the subject at an angle of view that is different from an angle of view of the external apparatus.

Further aspects of the embodiments will become apparent from the following description of exemplary embodiments.

BRIEF DESCRIPTION OF THE DRAWINGS

FIGS. 4A and 4B are diagrams illustrating a change of an image capture mode according to the first exemplary embodiment.

FIG. 6 is a flowchart illustrating an image capture sequence of the unmanned image capture apparatus (drone) according to the second exemplary embodiment.

FIGS. 7A to 7C are diagrams illustrating a control operation for determining an image capture opportunity of a main subject by the unmanned image capture apparatus (drone) according to the third exemplary embodiment.

FIGS. 8A & 8B is a diagram illustrating a change of an image capture mode according to the third exemplary embodiment.

DESCRIPTION OF THE EMBODIMENTS

Figure 1:
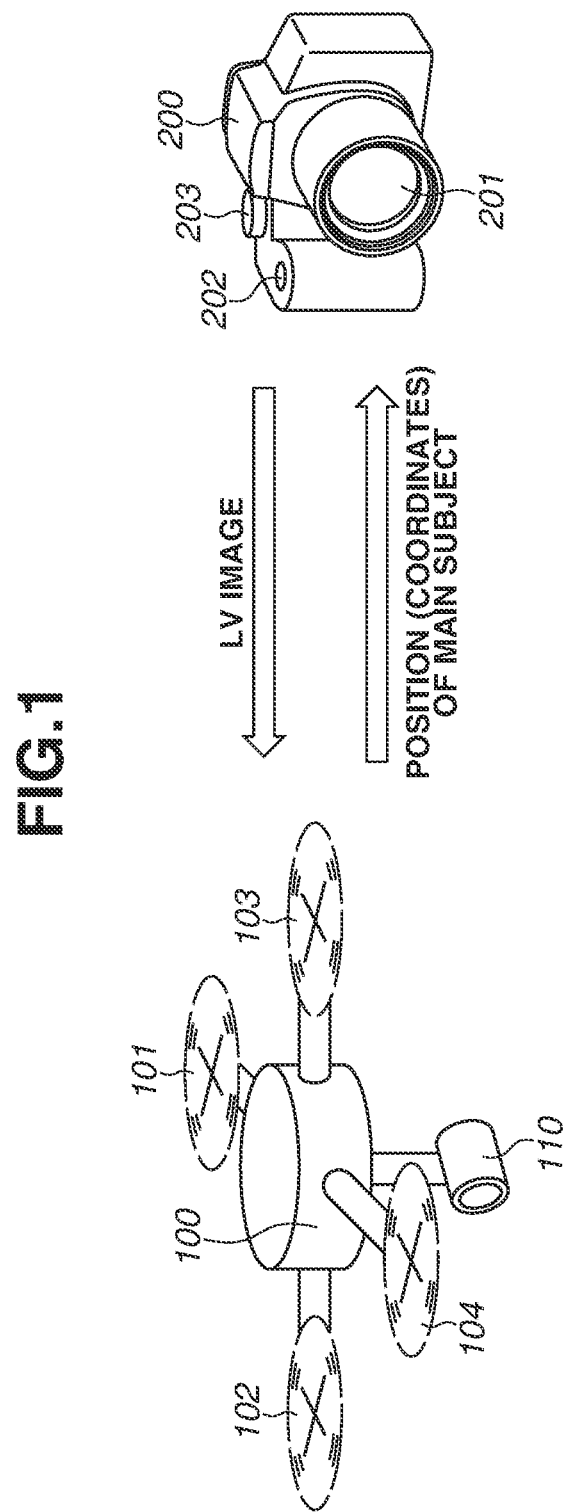
FIG. 1 is a diagram illustrating information for communicating between an unmanned image capture apparatus (drone) and another image capture apparatus (handheld camera) according to first to fifth exemplary embodiments.

Exemplary embodiments, features, and aspects of the disclosure will be described below with reference to the drawings. However, aspects of the disclosure are not limited to the following embodiments. In the descriptions of the exemplary embodiments below, similar configurations, similar operations, and similar processes are respectively given the same reference numerals in the drawings. While a camera-integrated drone and a handheld camera are described as image capture apparatuses in the exemplary embodiments below, the image capture apparatuses applicable to the exemplary embodiments are not limited to camera-integrated drones and handheld cameras. The image capture apparatuses can be apparatuses of any forms as long as an angle of view of at least one image capture apparatus can be changed based on an image captured by another image capture apparatus.

[First Exemplary Embodiment] A first exemplary embodiment will now be described. In the first exemplary embodiment, an image capture system in which a camera-integrated drone that can move without a person and a camera (hereinafter, "handheld camera") operated by a person to capture an image cooperate to capture images will be described.

FIG. 1 is a diagram illustrating information for communicating between an unmanned image capture apparatus (drone) and another image capture apparatus (handheld camera) according to the exemplary embodiments. A drone 100 includes an image capture unit 110 consisting of, for example, an imaging optical unit 111 and an image sensor 112 described below. The drone 100 is an unmanned image capture apparatus that can fly without a person. The drone 100 includes motors for rotating four rotors 101 to 104. The motors rotate the rotors 101 to 104 with an appropriate balance to fly the drone 100. The image capture unit 110 performs an image capture operation based on the determination by a below-described central processing unit (CPU) 130 installed in the drone 100. Details of the CPU 130 and an image capture condition will be described below.

A handheld camera 200 is an image capture apparatus operated by a person (user) to capture an image. The drone 100 and the handheld camera 200 communicate various types of information via a wireless communication facility, such as Wireless Fidelity (Wi-Fi). In the first exemplary embodiment, the handheld camera 200 transmits a live view (hereinafter, "LV") image captured by the handheld camera 200 to the drone 100 via the wireless communication facility, such as Wi-Fi. Furthermore, the drone 100 detects a pre-registered main subject from images captured by the drone 100 and images transmitted from the handheld camera 200, and calculates coordinates of the detected main subject. The drone 100 further transmits the calculated coordinate information to the handheld camera 200 via the wireless communication facility, such as Wi-Fi.

The handheld camera 200 includes an imaging optical unit 201 and operation members, such as a shutter button 202 and a dial 203. The imaging optical unit 201 can be fixed to the handheld camera 200 or can be a detachable interchangeable lens. The shutter button 202 is an operation member for receiving a user operation and issuing an image capture instruction. The user issues an image capture preparation instruction by half-pressing (SW1) the shutter button 202 and issues an image capture instruction by fully pressing (SW2) the shutter button 202. The dial 203 is a dial-type operation member. The user can change a setting or issue an instruction to change, for example, a menu, a mode, or a setting by turning the dial 203.

Figure 2:
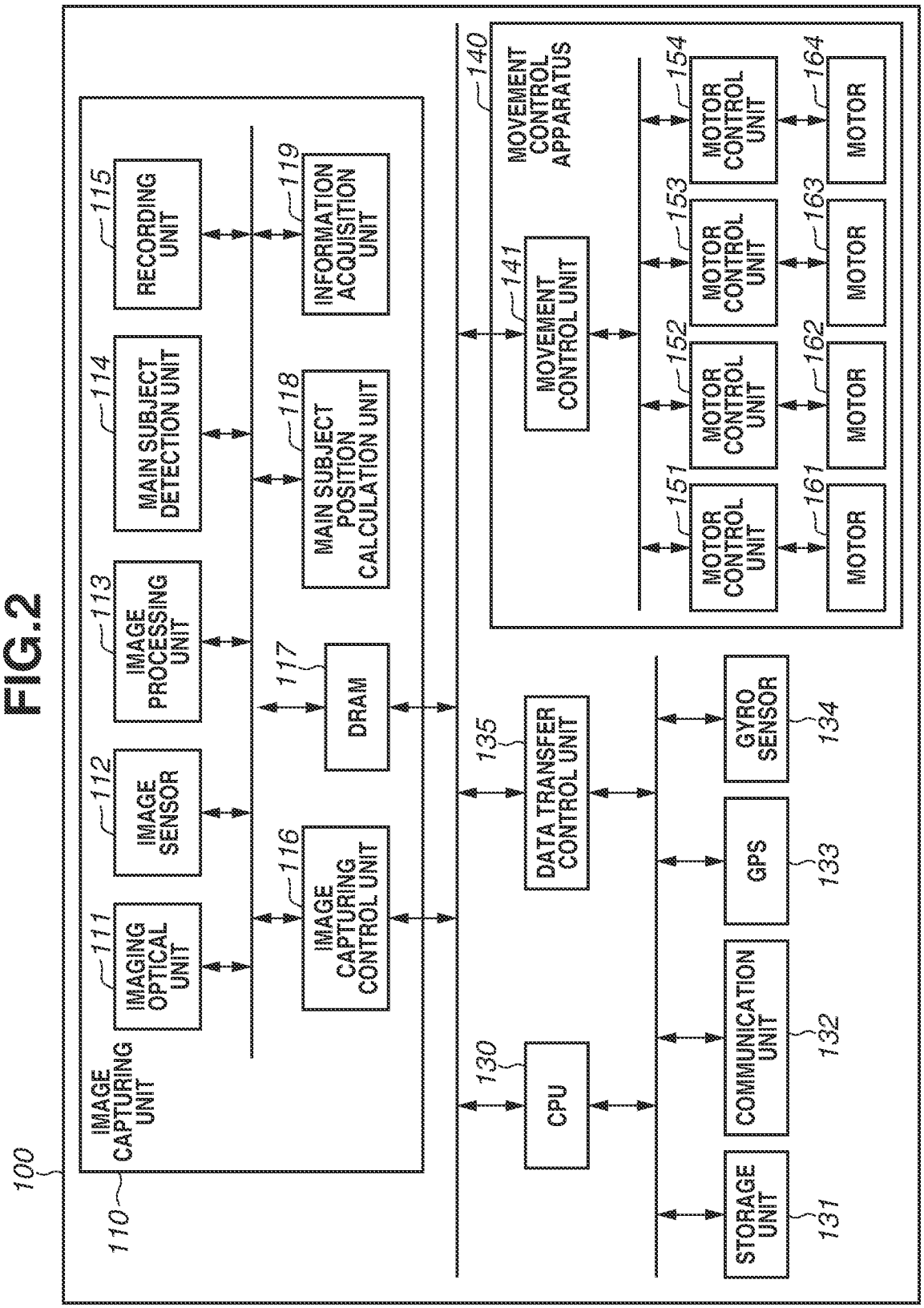
FIG. 2 is a block diagram illustrating an example of a configuration of the unmanned image capture apparatus (drone) according to the first to fifth exemplary embodiments.

FIG. 2 is a block diagram illustrating an example of a configuration of the unmanned image capture apparatus (drone) according to the first exemplary embodiment.

The image capture unit 110 includes the imaging optical unit 111, the image sensor 112, and an image processing unit 113. The image capture unit 110 captures an image of a subject and generates image data. The imaging optical unit 111 includes a focus lens, a zoom lens, and a diaphragm. The imaging optical unit 111 performs focus adjustment and exposure adjustment and forms a subject image on the image sensor 112. The image sensor 112 is an image sensor, such as a charge-coupled device (CCD) image sensor, that converts an optical image formed via the imaging optical unit 111 into an electric signal.

The image processing unit 113 is an image processing unit that performs various types of image processes, such as a white balance adjustment process and a noise reduction process, to perform development on the captured image data.

A main subject detection unit 114 detects a pre-registered main subject from an input image. For example, in a case where the main subject is a person, the main subject detection unit 114 detects the orientation and size of the face of the main subject. The subject detection unit 114 acquires various types of information, such as the position of the main subject on an image capture screen, about the main subject. The main subject detection unit 114 detects the main subject from an image captured by the drone 100. The main subject detection unit 114 detects the main subject from an LV image received from the handheld camera 200 via a communication unit 132 as described below.

A recording unit 115 records a captured image in a recording medium.

An image capture control unit 116 includes a sub-CPU, and comprehensively controls the image capture unit 110 to execute image capturing.

A dynamic random access memory (DRAM) 117 is a memory for temporarily storing image data.

A main subject position calculation unit 118 generates coordinate information about the main subject. The main subject position calculation unit 118 generates distance information between the drone 100 and the main subject based on images captured by the drone 100 and detection results of the main subject detection unit 114. The distance between the main subject and the drone 100 can be calculated by a commonly-used known method. The main subject position calculation unit 118 generates coordinate information about the main subject based on the acquired distance information and the coordinate information about the drone 100 acquired by a global positioning system (GPS) 133 described below. The coordinate information about the main subject that has been calculated by the main subject position calculation unit 118 is transmitted to the handheld camera 200 via the communication unit 132 described below.

An information acquisition unit 119 acquires information about the main subject included in a received LV image based on a detection result of the main subject detected by the main subject detection unit 114 from the LV image received from the handheld camera 200. The information acquisition unit 119 acquires information, such as the orientation and size of the face of the main subject captured by the handheld camera 200, from the detection result of the main subject detected by the main subject detection unit 114 from the LV image acquired from the handheld camera 200. The information acquisition unit 119 further acquires position information about the handheld camera 200 via the communication unit 132, and calculates the position of the subject based on the acquired position information and the detection result of the main subject detected by the main subject detection unit 114 from the LV image acquired by the handheld camera 200. The information acquisition unit 119 acquires information, such as the orientation and size of the face of the main subject captured by the drone 100, from the result of the detection of the main subject detected by the main subject detection unit 114 from images captured by the drone 100.

The CPU 130 is a control unit including at least one processor or circuit and comprehensively controls the drone 100. The CPU 130 realizes each below-described process in the exemplary embodiments by executing a program recorded in a storage unit 131 described below. The CPU 130 calculates coordinates of a movement destination for image capturing at an angle of view different from the angle of view of the handheld camera 200 based on, for example, information about the main subject in the LV image from the handheld camera 200, information about the main subject in the image captured by the drone 100, and a preset image capture condition. The CPU 130 instructs a movement control unit 141 to move the drone 100 to the calculated coordinates of the movement destination and instructs the image capture control unit 116 to capture an image.

The storage unit 131 stores the programs executable by the CPU 130.

The communication unit 132 communicates with the handheld camera 200. The communication unit 132 transmits and receives the LV image captured by the handheld camera 200 and various types of information, such as the coordinates of the main subject. A data transfer control unit 135 controls data transfer between the communication unit 132 and the image capture unit 110. The GPS 133 detects information about the position and coordinates of the drone 100. A gyro sensor 134 detects an angle and an angular velocity of the drone 100.

A movement control apparatus 140 includes the movement control unit 141, motor control units 151 to 154, and motors 161 to 164. Rotors 101 to 104 are respectively connected to the motors 161 to 164. The movement control unit 141 includes a sub-CPU. The movement control unit 141 controls flight of the drone 100 based on the instruction form the CPU 130 and information detected by the gyro sensor 134.

Figure 3:
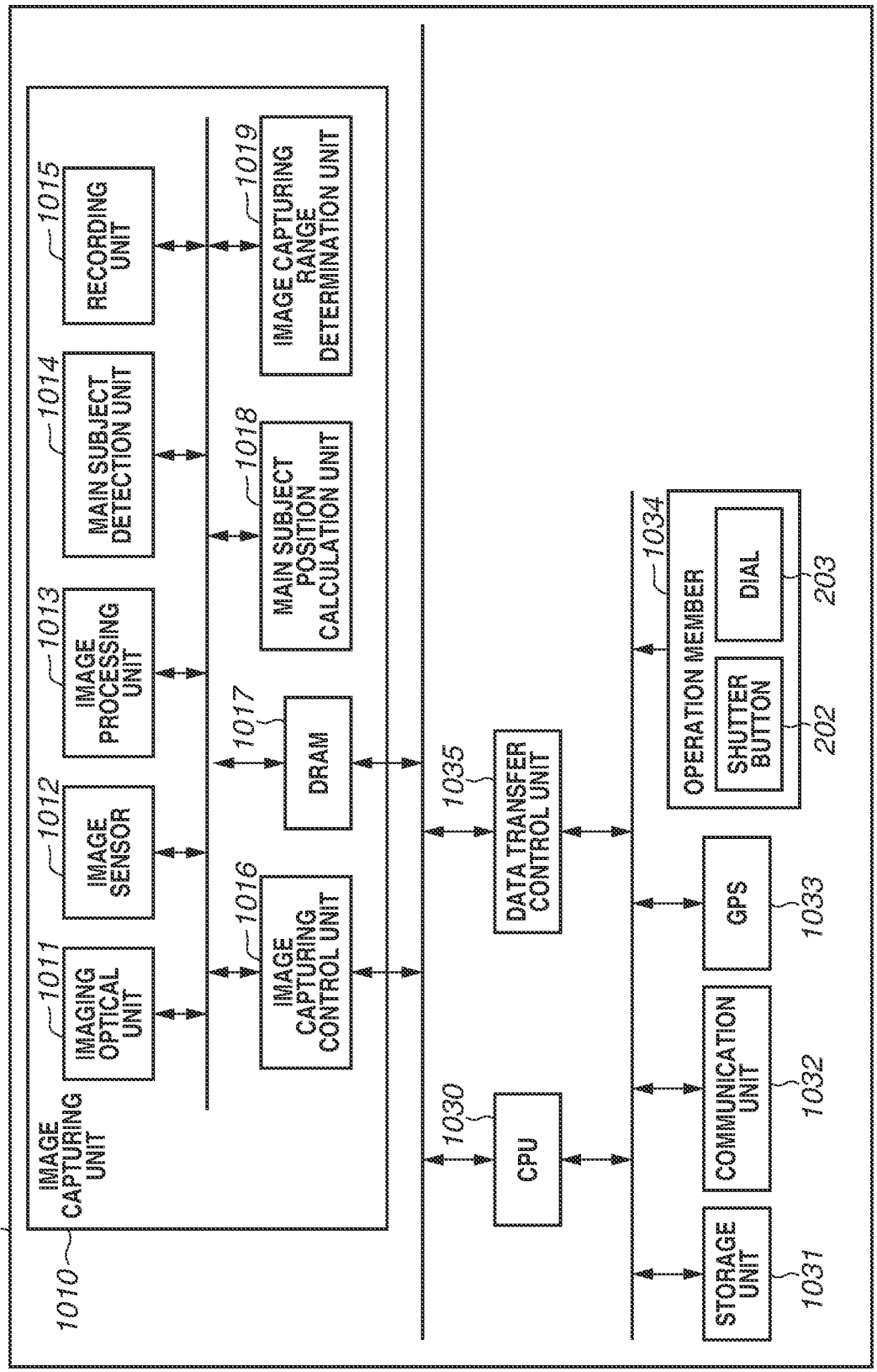
FIG. 3 is a block diagram illustrating an example of a configuration of the other image capture apparatus (handheld camera) according to the first to fifth exemplary embodiments.

FIG. 3 is a block diagram illustrating an example of a configuration of the other image capture apparatus (handheld camera 200) according to the first exemplary embodiment.

An image capture unit 1010 includes an imaging optical unit 1011, an image sensor 1012, and an image processing unit 1013. The image capture unit 1010 captures a subject image and generates image data. The imaging optical unit 1011 includes a focus lens, a zoom lens, and a diaphragm. The imaging optical unit 1011 performs focus adjustment and exposure adjustments and forms a subject image on the image sensor 1012. The image sensor 1012 is an image sensor, such as a CCD image sensor, that converts an optical image formed via the imaging optical unit 1011 into an electric signal.

The image processing unit 1013 is an image processing unit that performs various types of image processes, such as a white balance adjustment process and a noise reduction process, to perform development on the captured image data.

A main subject detection unit 1014 detects the pre-registered main subject from an input image. The main subject detection unit 114 detects the main subject from the input image. The main subject detection unit 1014 acquires various types of information about the main subject, such as the orientation and size of the face of the main subject and the position of the main subject on an image capture screen.

A recording unit 1015 records an image captured by the handheld camera 200 in a recording medium.

An image capture control unit 1016 includes a sub-CPU. The image capture control unit 1016 comprehensively controls the image capture unit 1010 and performs image capturing.

A DRAM 1017 is a memory for temporarily storing image data.

A main subject position calculation unit 1018 calculates coordinate information about the main subject.

An image capture range determination unit 1019 determines a range of a shooting angle of view based on lens zoom information acquired from the imaging optical unit 1011 or the image capture control unit 1016.

A CPU 1030 is a main CPU that comprehensively controls the handheld camera 200. The CPU 1030 is a control unit including at least one processor or circuit and comprehensively controls the handheld camera 200. The CPU 1030 realizes each below-described process in the exemplary embodiments by executing a program recorded in a storage unit 1031 described below.

The storage unit 1031 stores programs that are executable by the CPU 1030.

A communication unit 1032 communicates with the drone 100. The communication unit 1032 transmits and receives the captured LV image and various types of information, such as the coordinates of the main subject. The communication unit 1032 transmits operation mode instruction information to the drone 100 and receives auxiliary information from the drone 100. The auxiliary information herein is an image captured by the drone 100 or position information about a subject detected by the drone 100.

A GPS 1033 detects information about the position and coordinates of the handheld camera 200. A data transfer control unit 1035 controls data transfer between the communication unit 1032 and the image capture unit 1010. An operation member 1034 is an operation member that receives user operations. The operation member 1034 includes the shutter button 202 and the dial 203.

FIGS. 4A and 4B are diagrams illustrating a change of an image capture mode according to the first exemplary embodiment. In the first exemplary embodiment, an image capture system in which the drone 100 and the handheld camera 200 cooperate and continuously capture images of the same subject A as a main subject will be described below.

In the first exemplary embodiment, the drone 100 includes two operation mode. FIG. 4A is a diagram illustrating a first operation mode, and FIG. 4B is a diagram illustrating a second operation mode. When activated, the drone 100 receives the LV image captured by the handheld camera 200. The drone 100 detects the subject A, which is pre-registered as the main subject, from the received LV image. In a case where the subject A is not detected, the drone 100 operates in the first operation mode, whereas in a case where the subject A is detected, the drone 100 operates in the second operation mode. In a case where the drone 100 does not receive the LV image from the handheld camera 200, the drone 100 operates in the first operation mode.

In the first exemplary embodiment, in a case where the main subject detection unit 114 detects the main subject and the face of the detected main subject is greater than a predetermined size, it is determined that the LV image includes information about the main subject. In a case where the main subject is not detected or the size of the face of the detected main subject is not greater than the predetermined size, it is determined that the LV image does not include information about the main subject. In a case where the information acquisition unit 119 determines that the LV image captured by the handheld camera 200 does not include information about the main subject, the drone 100 searches for the main subject, captures an image including the main subject, and records a captured image in the recording medium (first operation mode).

In contrast, in a case where the information acquisition unit 119 determines that the LV image captured by the handheld camera 200 includes information about the main subject, the drone 100 captures an image at an angle of view different from the angle of view of the handheld camera 200 and records a captured image in the recording medium (second operation mode).

The first operation mode will now be described with reference to FIG. 4A. The first operation mode is an operation mode for a situation where an image of the main subject is not captured by the handheld camera 200 for some reason, e.g., the person (user) operating the handheld camera 200 does not successfully detect the subject A which is the main subject. In a case where the subject A is not detected from the LV image received from the handheld camera 200, the drone 100 operates in the first operation mode. In the first operation mode, the drone 100 searches for the subject A from an LV image captured by the drone 100. In a case where the image captured by the drone 100 does not include the subject A, the drone 100 searches for the subject A by changing an image capture direction and/or moving the position of the drone 100. When the subject A is detected from a captured image, the drone 100 performs image capturing based on a predetermined condition, such as an angle of view, so that a captured image includes the subject A. For example, in the first operation mode, an image capture direction (e.g., front) for the subject A, or a ratio of face size and a face position of the main subject are preset to the drone 100. As described above in the first operation mode, the drone 100 searches for a specific subject and captures an image of the detected subject from a predetermined direction at a predetermined size.

In the first exemplary embodiment, the drone 100 calculates the coordinates (position information) of the subject A detected from the image captured by the drone 100 based on information from the built-in GPS 133 and focal length information at the time of image capturing. When the subject A is detected from the image captured by the drone 100, the drone 100 transmits the calculated coordinate information about the subject A to the handheld camera 200.

The handheld camera 200 includes the built-in GPS 1033 and acquires the coordinates (position information) of the handheld camera 200 based on information from the GPS 1033. The handheld camera 200 compares the coordinates of the subject A received from the drone 100 and the coordinates of the handheld camera 200 and displays an arrow icon specifying the location of the subject A on a display unit of the handheld camera 200. The person (user) operating the handheld camera 200 can move to a position where an image of the subject A can be captured referring to the displayed location information about the subject A. If the person operating the handheld camera 200 finds the subject A and attempts to capture an image of the subject A, the LV image captured by the handheld camera 200 includes the subject A. When the subject A is detected from the LV image received from the handheld camera 200, the drone 100 changes to the second operation mode.

The second operation mode will now be described with reference to FIG. 4B. The second operation mode is an operation mode for a situation where the person operating the handheld camera 200 captures an image of the main subject. In this case, the drone 100 detects the subject A, which is pre-registered as the main subject, from the LV image received from the handheld camera 200. In other words, this is a situation where the handheld camera 200 can capture an image of the main subject. Thus, the drone 100 captures an image different from the image captured by the handheld camera 200. An image capture condition in the second operation mode is preset to the drone 100. For example, in the first exemplary embodiment, the drone 100 is set to capture an image of the subject A captured by the handheld camera 200 at an angle of view different from the angle of view of the handheld camera 200. As a condition for capturing an image of the main subject at the angle of view different from the angle of view of the handheld camera 200, an angle difference (e.g., 90 degrees, and 180 degrees) from the orientation of the face of the main subject captured by the handheld camera 200, or a ratio of face size and a position of the main subject with respect to the image can be set to the drone 100. The drone 100 receives information about the angle of view of the image captured by the handheld camera 200 from the handheld camera 200 via the communication unit 132.

In a case where the subject A becomes undetectable from the LV image received from the handheld camera 200 while the drone 100 is operating in the second operation mode, the drone 100 changes to operate in the first operation mode. Thus, even in a case where the person operating the handheld camera 200 becomes unable to capture an image of the subject A during image capturing, the drone 100 instead of the handheld camera 200 can capture an image including the subject A based on the predetermined condition, such as the predetermined angle of view.

As described above, in a situation where the person operating the handheld camera 200 cannot capture an image of the main subject, the drone 100 captures an image including the main subject based on the predetermined condition, e.g., the drone 100 captures an image of the main subject from the front. Thus, an image of the main subject can be captured without missing an image capture opportunity. Furthermore, while the person operating the handheld camera 200 captures an image of the main subject, the drone 100 captures an image of the main subject from the angle of view different from the angle of view of the handheld camera 200, and thereby images of the main subject can be captured at various angles of view.

Figure 5:
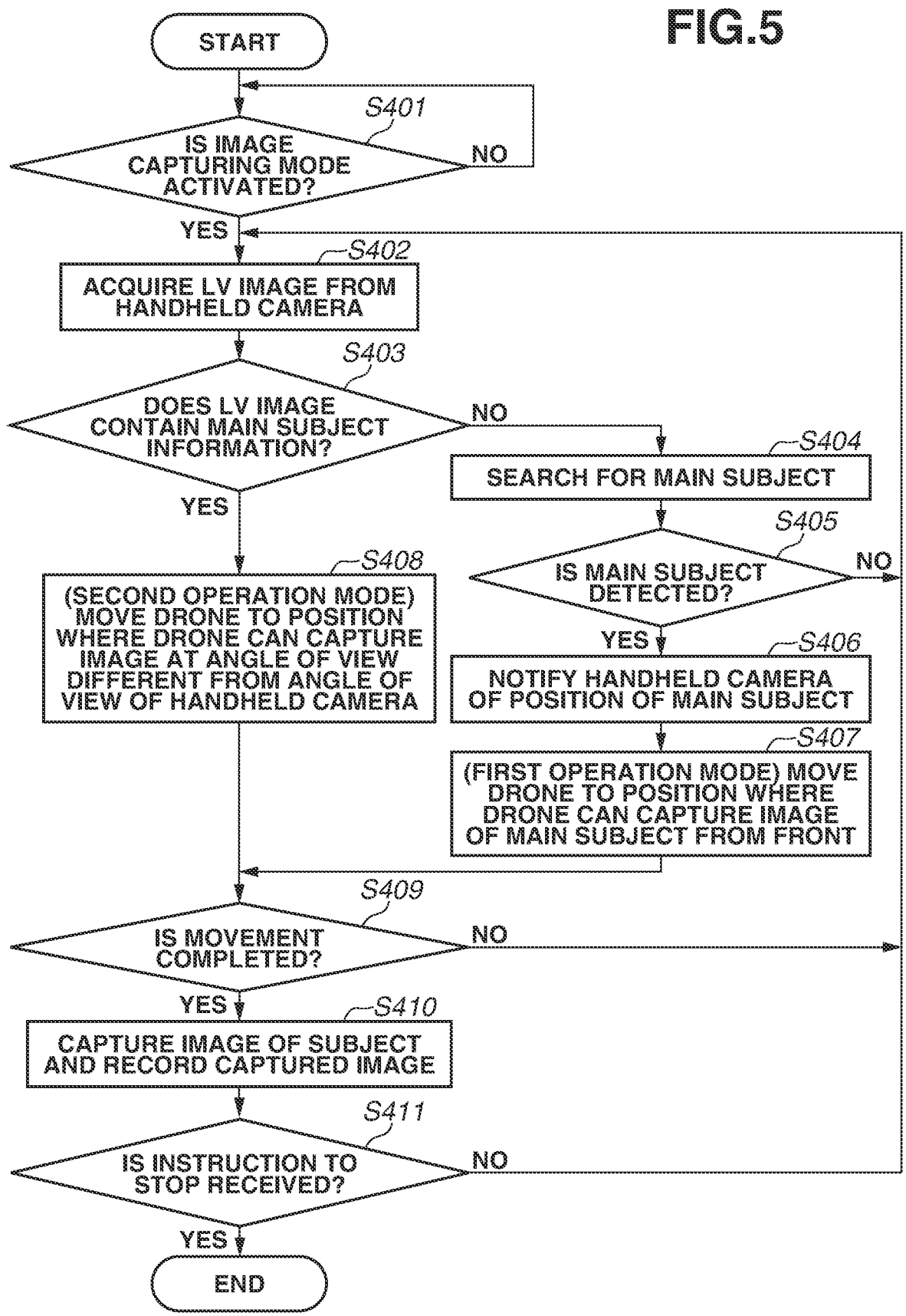
FIG. 5 is a flowchart illustrating an image capture sequence of the unmanned image capture apparatus (drone) according to the first exemplary embodiment.

FIG. 5 is a flowchart illustrating an image capture sequence of the unmanned image capture apparatus (drone 100) according to the first exemplary embodiment. The CPUs 130 and 1030 execute programs stored in the storage unit 131 and 1031, and control the components of the drone 100 and the components of the handheld camera 200 to thereby realize the process illustrated in the flowchart in FIG. 5. The flowchart illustrated in FIG. 5 starts when the drone 100 and the handheld camera 200 are turned on and start cooperating.

In step S401, the drone 100 determines whether the image capture mode is activated. In a case where the image capture mode is activated (YES in step S401), the process of FIG. 5 proceeds to step S402. In contrast, in a case where the image capture mode is not activated (NO in step S401), the drone 100 waits for activation of the image capture mode.

In step S402, the drone 100 acquires an LV image captured by the handheld camera 200 via the communication unit 132.

In step S403, the information acquisition unit 119 determines whether the LV image acquired from the handheld camera 200 includes information about a pre-registered main subject. In a case where the LV image acquired from the handheld camera 200 does not include information about the main subject (NO in step S403), the process of FIG. 5 proceeds to step S404. In contrast, in a case where the LV image includes information about the main subject (YES in step S403), the process of FIG. 5 proceeds to step S408.

In the case where the LV image from the handheld camera 200 does not include the main subject, in step S404, the CPU 130 issues an instruction to the image capture unit 110 and the movement control apparatus 140, captures images at different angles of view while changing the position or image capture direction of the drone 100, and searches for the main subject.

In step S405, the CPU 130 determines whether the main subject detection unit 114 detects the main subject in the image captured by the drone 100. In a case where the main subject is detected (YES in step S405), the process of FIG. 5 proceeds to step S406. In contrast, in a case where the main subject is not detected (NO in step S405), the process of FIG. 5 returns to step S402, and steps S402 to S405 are repeated until the main subject is detected from the LV image acquired from the handheld camera 200 or from the image captured by the drone 100.

In the case where the main subject is detected in step S405, in step S406, the drone 100 notifies the handheld camera 200 of the position information about the detected main subject.

In step S407, the movement control unit 141 controls the drone 100 to move to a position where an image of the main subject can be captured in the preset condition based on the position information about the detected main subject. At this time, for example, the orientation of the face of the main subject, the ratio of the face with respect to the angle of view, and the position of the face can be preset as a condition for the drone 100 to capture an image of the main subject.

In contrast, in a case where the information acquisition unit 119 determines that the LV image from the handheld camera 200 includes information about the main subject (YES in step S403), the process of FIG. 5 proceeds to step S408. In step S408, the movement control unit 141 controls the drone 100 to move to a position where the drone 100 can capture an image at the angle of view different from the shooting angle of view of the handheld camera 200.

In step S409, the CPU 130 determines whether the movement of the drone 100 is completed. In a case where the movement is not completed (NO in step S409), the process of FIG. 5 returns to step S402, and steps S402 to S409 are repeated. The drone 100 is then moved to a position where the drone 100 can capture an image at a desired angle of view.

When the movement to the position where an image can be captured at the desired angle of view is completed (YES in step S409), in step S410, the CPU 130 instructs the image capture control unit 116 to capture an image of the main subject and record the captured image.

In step S411, whether a user instruction to stop is received is determined. If an instruction to stop is received (YES in step S411), the operation is stopped. If an instruction to stop is not received (NO in step S411), the process of FIG. 5 returns to step S402, and the same control is repeated. In any of the steps in the flowchart, in a case where an operation stop instruction is received, the image capture mode is stopped, and the flowchart ends.

As described above, with the control according to the first exemplary embodiment, the drone 100 captures an image of the main subject, and therefore an image of the main subject is captured without missing an image capture opportunity even in a case where the handheld camera 200 loses sight of the main subject. Furthermore, since the handheld camera 200 and the drone 100 capture images at different angles of view, the possibility of missing an image capture opportunity is further reduced.

In the first exemplary embodiment, the drone 100 determines that information about the main subject is included in a case where the face of the main subject detected from the LV image received from the handheld camera 200 is greater than the predetermined size. Alternatively, the determination can be based on a condition other than the face size.

Furthermore, while the image capture condition (e.g., an image is to be captured from the front) for the drone 100 in the first operation mode is preset in the first exemplary embodiment, the setting is not limited to that described above. For example, the handheld camera 200 may set the image capture condition for the drone 100 and transmit the condition to the drone 100, and the drone 100 may capture an image in the transmitted condition. Similarly, the image capture condition (e.g., an image is to be captured at a different angle of view) for the drone 100 in the second operation mode may be set by the person operating the handheld camera 200, and an instruction about the set condition may be transmitted to the drone 100.

In the first exemplary embodiment, the drone 100 captures an image of the main subject from the front in the first operation mode. Alternatively, the drone 100 may capture an image in an image capture condition other than the front, or the drone 100 can capture different images in image capture conditions.

Furthermore, the drone 100 captures an image of the main subject at the angle of view different from the angle of view of the handheld camera 200 in the second operation mode. Alternatively, different image capture conditions may be set, and images may be captured at different angles of view. Furthermore, the drone 100 may capture an image in an image capture condition other than the different angle of view or may capture an image of another subject. Furthermore, the drone 100 may capture an image at a wide angle of view including the main subject, determine an image capture target using a unique algorithm, or capture an image while sequentially changing the angle of view.

In the first exemplary embodiment, the LV image captured by the handheld camera 200 is transmitted to the drone 100. Alternatively, the handheld camera 200 may detect information about the main subject captured in the LV image and transmit the detected information to the drone 100.

In the first exemplary embodiment, the handheld camera 200 displays the arrow icon specifying the location of the main subject on the screen based on the main subject information received from the drone 100. Alternatively, any other forms may be used to display the location of the main subject. For example, the handheld camera 200 may display the coordinates of the position of the main subject or the direction or coordinates to which the handheld camera 200 should move.

In the first exemplary embodiment, the drone 100 includes a unit for acquiring main subject information and a unit for changing the operation mode. Alternatively, an image capture system that controls the drone 100 or the handheld camera 200 may include the units.

[Second Exemplary Embodiment] A second exemplary embodiment will now be described in detail with reference to FIG. 6.

Configurations of a drone 100 and a handheld camera 200 according to the second exemplary embodiment are similar to those illustrated in FIGS. 2 and 3 in the first exemplary embodiment, and thus redundant descriptions thereof are omitted. The second exemplary embodiment is different from the first exemplary embodiment in that the handheld camera 200 can instruct the drone 100 to change from the second operation mode to the first operation mode and the drone 100 changes the mode based on the instruction from the handheld camera 200. Furthermore, in the second exemplary embodiment, the drone 100 notifies the handheld camera 200 of whether the image capture condition for the main subject in the first operation mode matches the preset image capture condition. Whereby, the operation mode can be changed so that the drone 100 captures an image of the main subject without waiting until the main subject is no longer detected from the LV image in a case, for example, where the handheld camera 200 is to capture an image of a subject other than the main subject temporarily.

In the second exemplary embodiment, operations in changing from the second operation mode to the first operation mode will be described. In the second operation mode illustrated in FIG. 4B, as in the first exemplary embodiment, the handheld camera 200 captures an image of the subject A, and the drone 100 captures an image of the subject A at an angle of view different from the angle of view of the handheld camera 200. In a case where the person operating the handheld camera 200 captures an image of a subject different from the subject A, the main subject is no longer detected from the LV image captured by the handheld camera 200 in the first exemplary embodiment. Thus, the drone 100 automatically changes to the first operation mode (FIG. 4A). However, it takes time for the drone 100 to move to a position where the drone 100 can capture an image in the preset image capture condition (e.g., the front of the subject) for the first operation mode, so that an image capture opportunity of the main subject may be missed during the movement.

In the second exemplary embodiment, the person operating the handheld camera 200 instructs the drone 100 to change to the first operation mode by operating the operation member 1034 (e.g., forced mode change button) of the handheld camera 200. When the drone 100 receives a forced mode change instruction to change to the first operation mode, the drone 100 changes to the first operation mode and starts moving to a position where an image of the subject A can be captured in the preset image capture condition (e.g., the front of the subject A) for capturing an image of the subject A.

In the first exemplary embodiment, the drone 100 does not change to the first operation mode until the subject A is no longer detected from the image received from the handheld camera 200. In the second exemplary embodiment, the person operating the handheld camera 200 can start capturing an image of a subject other than the subject A using the handheld camera 200 after the drone 100 is changed to the first operation mode and moved.

When an instruction to change the operation mode is received from the handheld camera 200, the drone 100 moves to a position (e.g., the front of the subject A) that matches the preset image capture condition and where an image of the subject A as the main subject can be captured. When the image capture condition for the subject A matches the preset image capture condition, the drone 100 notifies the handheld camera 200 that the movement is completed. The drone 100 captures an image of the subject A in the predetermined condition and records the captured image in the recording medium. The person operating the handheld camera 200 starts image capturing for another subject after the movement completion notification is received from the drone 100. This prevents an image capture opportunity of the main subject from being missed during the operation mode change.

In a case where the person operating the handheld camera 200 desires to capture an image of the main subject again, the forced mode change instruction is cancelled using the operation member 1034, and thereby the drone 100 changes the operation mode based on the LV image from the handheld camera 200 again.

FIG. 6 is a flowchart illustrating an image capture sequence of the unmanned image capture apparatus (drone 100) according to the second exemplary embodiment. The CPUs 130 and 1030 execute programs stored in the storage unit 131 and 1031, and control the components of the drone 100 and the components of the handheld camera 200 to thereby realize the process illustrated in the flowchart in FIG. 6. The flowchart illustrated in FIG. 6 starts when the drone 100 receives an instruction to change the operation mode issued by a user operation from the handheld camera 200 in the image capture sequence illustrated in FIG. 5.

The CPU 130 determines whether a forced mode change instruction is issued from the handheld camera 200. In a case where a forced mode change instruction is issued, the process illustrated in FIG. 6 is started. In a case where the forced mode change is cancelled, the process of FIG. 6 returns to the operations based on the image capture sequence in FIG. 5.

In step S601, the movement control unit 141 controls the drone 100 based on the position information about the detected main subject to move the drone 100 to a position where the drone 100 can capture an image of the main subject at the preset angle of view. The information acquired by the image capture sequence illustrated in FIG. 5 is used as the position information about the main subject. For example, in a case where the handheld camera 200 captures an image of the main subject, the position information about the main subject is detected based on the main subject position information detected by the main subject position calculation unit 118 and the position information about the handheld camera 200 acquired from the information acquisition unit 119. In a case where the handheld camera 200 does not capture an image of the main subject, the drone 100 searches for the main subject, detects the main subject, and calculates the position of the main subject as described above in steps S404 and S405.

In step S602, the CPU 130 determines whether the movement is completed.

If the movement is completed (YES in step S602), the process of FIG. 6 proceeds to step S603. In step S603, a notification of the completion of the movement is transmitted to the handheld camera 200.

In step S604, an image of the main subject is captured, and the captured image is recorded.

In step S605, if a user instruction to stop is received (YES in step S605), the CPU 130 of the drone 100 stops operating. If an instruction to stop is not received (NO in step S605), the process of FIG. 6 returns to step S601, and the subsequent processes are continued.

When the CPU 130 of the drone 100 is instructed to cancel the forced mode change instruction by the handheld camera 200, the flowchart ends, and the process of FIG. 6 returns to the image capture sequence in the flowchart illustrated in FIG. 5. In any of the steps in the flowchart, the image capture mode stops, and the flowchart ends when an instruction to cancel the forced operation mode change has been received.

As described above, with the control according to the second exemplary embodiment, the operation mode is changed from the second operation mode to the first operation mode based on a user instruction to cause the drone 100 to capture an image of the main subject.

In the second exemplary embodiment, the image capture condition (e.g., capturing an image from the front) for the drone 100 in the first operation mode is preset. Alternatively, the user may set the image capture condition by operating the handheld camera 200, and the drone 100 may capture an image based on a user instruction from the handheld camera 200. Furthermore, the drone 100 captures an image of the main subject from the front in the first operation mode in the second exemplary embodiment. Alternatively, the drone 100 may capture an image in an image capture condition other than capturing from the front, or different images may be captured in image capture conditions.

[Third Exemplary Embodiment] A third exemplary embodiment will now be described in detail with reference to FIGS. 7A to 9. Hardware configurations of a drone 100 and a handheld camera 200 according to the third exemplary embodiment are similar to those in the first exemplary embodiment, and thus redundant descriptions thereof are omitted.

In the third exemplary embodiment, an image capture system will be described in which the drone 100 captures a bird's-eye view image of an entire range regardless of an image captured by the handheld camera 200 and notifies the handheld camera 200 of information about the main subject when an image capture opportunity of the main subject is detected.

The drone 100 operates in a third operation mode in which a bird's-eye view image of an entire range is captured regardless of the image captured by the handheld camera 200. Thereafter, the drone 100 changes to the first operation mode for capturing an image of the subject A as a main theme when the drone 100 detects an image capture opportunity of the subject A registered as the main subject based on a change in the captured images. At the same time, the drone 100 notifies the handheld camera 200 that there is an image capture opportunity. If the handheld camera 200 arrives at the position of the subject A and starts capturing an image of the subject A, the drone 100 returns to the third operation mode and captures a bird's-eye view image.

In the third exemplary embodiment, the information acquisition unit 119 detects the subject A, which is pre-registered as the main subject, from the image captured by the drone 100 and detects a motion vector of the subject A. The motion vector is generated by a conventional method of calculating the difference between the coordinates of the position of the subject A in a frame of interest and the coordinates of the position of the subject A in the previous frame.

Figure 7A:
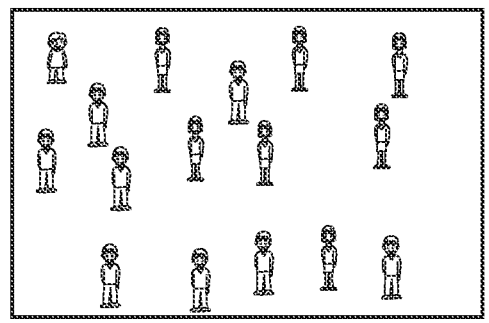
Figure 7B:
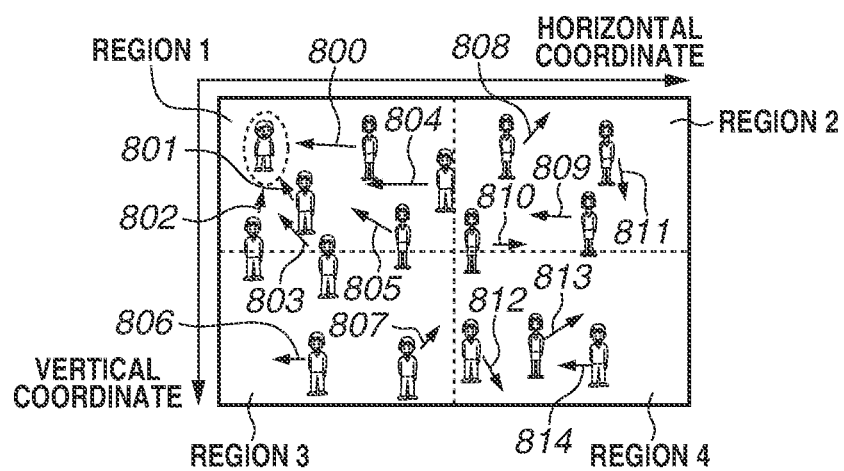

FIGS. 7A to 7C are diagrams illustrating a control operation of determining an image capture opportunity of the main subject with the unmanned image capture apparatus (drone 100) according to the third exemplary embodiment. FIG. 7A illustrates an image captured by the drone 100. FIG. 7B illustrates detected motion vectors of subjects and the captured image divided into four regions. FIG. 7B illustrates motion vectors 800 to 814 that are detected motion vectors. FIG. 7C illustrates detailed information about the detected motion vectors.

In FIG. 7C, IDs indicate the motion vectors 800 to 814 illustrated in FIG. 7B. The information about the motion vectors includes, for example, the coordinate position in the previous frame (start point of the arrow), the coordinate position in the frame of interest (end point of the arrow), the region to which the motion vector belongs among regions 1 to 4 of the image, the movement amount, and the absolute value of the average of the motion vectors in each region. A great absolute value of the average of the movement amounts indicates that the subjects in the region are moving in the same direction.

In the third exemplary embodiment, the drone 100 determines that there is a high possibility of an image capture opportunity of the main subject beyond the subjects when subjects move in the same direction. In a case where the absolute value of the average of the movement amounts is greater than a preset threshold value, the drone 100, which has been capturing a bird's-eye view image of an entire range, accordingly moves to a region with a great absolute value of the average of the movement amounts and starts capturing an image of the area. The drone 100 then notifies the handheld camera 200 of position information about the main subject detected by the main subject search.

FIGS. 8A and 8B are diagrams illustrating a change of the image capture mode according to the third exemplary embodiment. FIG. 8A is a diagram illustrating a change from the third operation mode to the first operation mode.

In the third exemplary embodiment, the drone 100 is preset to capture a bird's-eye view image of an entire range prior to image capturing, and at the time of activation (start time of image capturing), the drone 100 operates in the third operation mode.

The third operation mode will now be described. The third operation mode is an operation mode in which the drone 100 captures a bird's-eye view image of an entire range within a preset range regardless of an image captured by the handheld camera 200. An image capture range of the drone 100 for bird's-eye view images can be preset by a user operation (e.g., a range of a field in a case of a sports day). When the operation mode is changed to the third operation mode, the drone 100 then captures a bird's-eye view image of the entire preset range. At this time, the drone 100 may capture a bird's-eye view image at once to cover the entire set range, or capture images from different image capture directions and/or at different angles of view.

The drone 100 detects motion vectors from each divided region of the bird's-eye view image as described above and determines an image capture opportunity of the main subject. When the image capture opportunity is detected, the drone 100 changes to the first operation mode, moves to the position where the subject A, which is the main subject, is considered to be present, searches for the subject A, and captures an image of the subject A as a main theme. The drone 100 then detects the subject A based on information from the built-in GPS 133 and the captured image, calculates the coordinate information about the subject A based on, for example, position information about the subject A, and transmits the calculated coordinate information to the handheld camera 200.

The handheld camera 200 compares the coordinates of the subject A received from the drone 100 and the coordinates of the handheld camera 200, and displays an arrow icon specifying the location of the subject A on a liquid crystal panel of the handheld camera 200. The person operating the handheld camera 200 can move to a position where an image of the subject A can be captured referring to the displayed information about the location of the subject A.

FIG. 8B is a diagram illustrating a change from the first operation mode to the third operation mode. When the person operating the handheld camera 200 finds the main subject and attempts to capture an image of the main subject, the operating person transmits a notification to the drone 100 by operating an operation member such as a button on the panel. When the drone 100 receives a signal notifying that the handheld camera 200 has arrived at the image capture position for the subject A from the handheld camera 200, the drone 100 returns to the third operation mode and captures a bird's-eye view image of the entire range.

Figure 9:
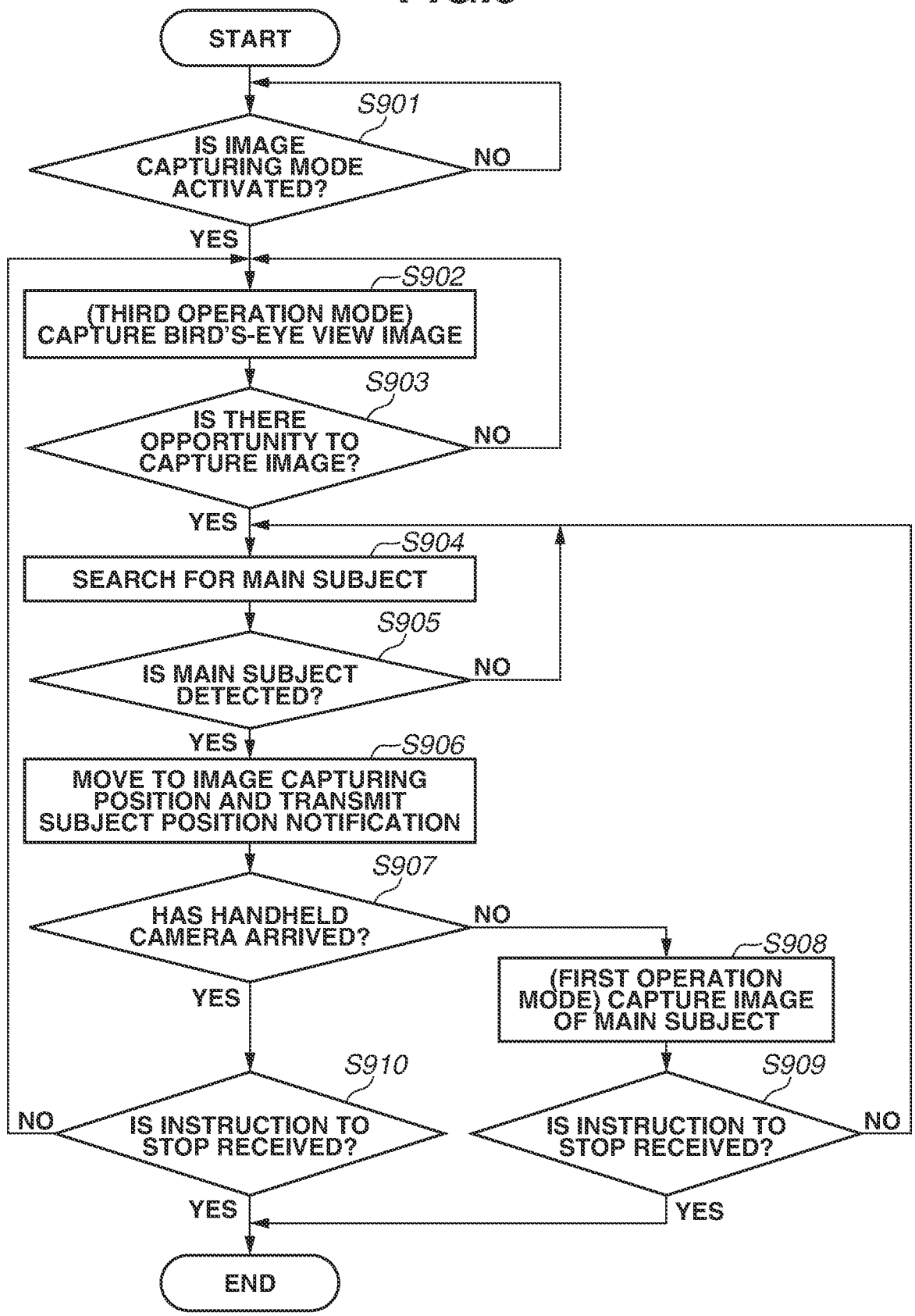
FIG. 9 is a flowchart illustrating an image capture sequence of the unmanned image capture apparatus (drone) according to the third exemplary embodiment.

FIG. 9 is a flowchart illustrating an image capture sequence of the unmanned image capture apparatus (drone 100) according to the third exemplary embodiment. The CPUs 130 and 1030 execute programs stored in the storage unit 131 and 1031, and control the components of the drone 100 and the components of the handheld camera 200 to thereby realize the process illustrated in the flowchart in FIG. 9. The flowchart illustrated in FIG. 9 starts when the drone 100 and the handheld camera 200 are turned on to start cooperation.

In step S901, the drone 100 determines whether the image capture mode is activated. If the image capture mode of the drone 100 is activated (YES in step S901), the process of FIG. 9 proceeds to step S902.

In step S902, the drone 100 operates in the third operation mode and captures a bird's-eye view image of the entire preset range.

In step S903, while the drone 100 captures a bird's-eye view image in the third operation mode, the information acquisition unit 119 acquires motion vectors and determines whether there is an image capture opportunity of the main subject based on the acquired motion vectors. In the third exemplary embodiment, the CPU 1030 determines that there is a high possibility of an image capture opportunity of the main subject beyond the subjects, in a case where, for example, subjects move in the same direction. If the CPU 1030 determines that there is an image capture opportunity (YES in step S903), the process of FIG. 9 proceeds to step S904. If the CPU 1030 determines that there is not an image capture opportunity (NO in step S903), the process of FIG. 9 proceeds to step S902 to continue capturing of a bird's-eye view image.

In step S904, the drone 100 moves to the region determined as a region where there is an image capture opportunity based on the motion vectors acquired in step S903, and searches for the main subject.

In step S905, the CPU 1030 determines whether the information acquisition unit 119 has detected the main subject. If the main subject is detected (YES in step S905), the process of FIG. 9 proceeds to step S906. If the main subject is not detected (NO in step S905), the process of FIG. 9 returns to step S904 to continue the search.

In step S906, the drone 100 moves to the position (e.g., the front of the main subject) set as the image capture condition for the first operation mode for capturing the main subject as a main theme. At this time, the drone 100 notifies the handheld camera 200 of the position information about the main subject.

In step S907, the CPU 1030 determines whether the handheld camera 200 has arrived at the image capture position for the main subject. If the handheld camera 200 has not arrived at the position (NO in step S907), the process of FIG. 9 proceeds to step S908. If the handheld camera 200 has arrived at the position (YES in step S907), the process of FIG. 9 proceeds to step S909. Whether the handheld camera 200 has arrived at the image capture position is determined based on whether, for example, a signal notifying that the handheld camera 200 has arrived at the main subject position is received from the handheld camera 200.

When the handheld camera 200 has arrived at the image capture position for the main subject, in step S908, the drone 100 captures an image of the main subject as a main theme in the first operation mode.

In step S909, when a user instruction to stop image capturing is received (YES in step S909), the drone 100 stops operating. If a user instruction to stop is not received (NO in step S909), the process of FIG. 9 returns to step S904, and the subsequent steps are continued.

In step S910, if a user instruction to stop image capturing is received (YES in step S910), the drone 100 stops operating. If a user instruction to stop is not received (NO in step S910), the process of FIG. 9 returns to S902, and the capturing of a bird's-eye view image is continued until an image capture opportunity of the main subject is detected. In any of the steps in the flowchart, the drone 100 stops the image capture mode and ends the flowchart when an operation stop instruction is received.

As described above, with the control according to the third exemplary embodiment, the drone 100 detects the image capture opportunity of the main subject and captures an image of the main subject, even if the handheld camera 200 does not recognize an image capture opportunity of the main subject.

In the third exemplary embodiment, the drone 100 determines an image capture opportunity of the main subject based on a change in the motion vectors. Alternatively, an image capture opportunity of the main subject may be determined based on a luminance change in the regions. Furthermore, in the above-described example, whether the handheld camera 200 has started capturing an image of the main subject is determined based on a user operation. Alternatively, the determination may be performed in response to the detection of the main subject in the LV image captured by the handheld camera 200 as in the first exemplary embodiment.

[Fourth Exemplary Embodiment] A fourth exemplary embodiment will be described in detail with reference to FIGS. 10, 11A, and 11B. In the fourth exemplary embodiment, the operation of the drone 100 changes between a main image capture mode and a detection mode depending on the image capture range of the handheld camera 200. The fourth exemplary embodiment is different from the first exemplary embodiment in that the operation mode of the drone 100 changes based on the image capture range of the handheld camera 200. The information communicated between the unmanned image capture apparatus and the other image capture apparatus and hardware configurations of the drone 100 and the handheld camera 200 are similar to those in the first exemplary embodiment, and thus redundant descriptions thereof are omitted.

Figure 10:
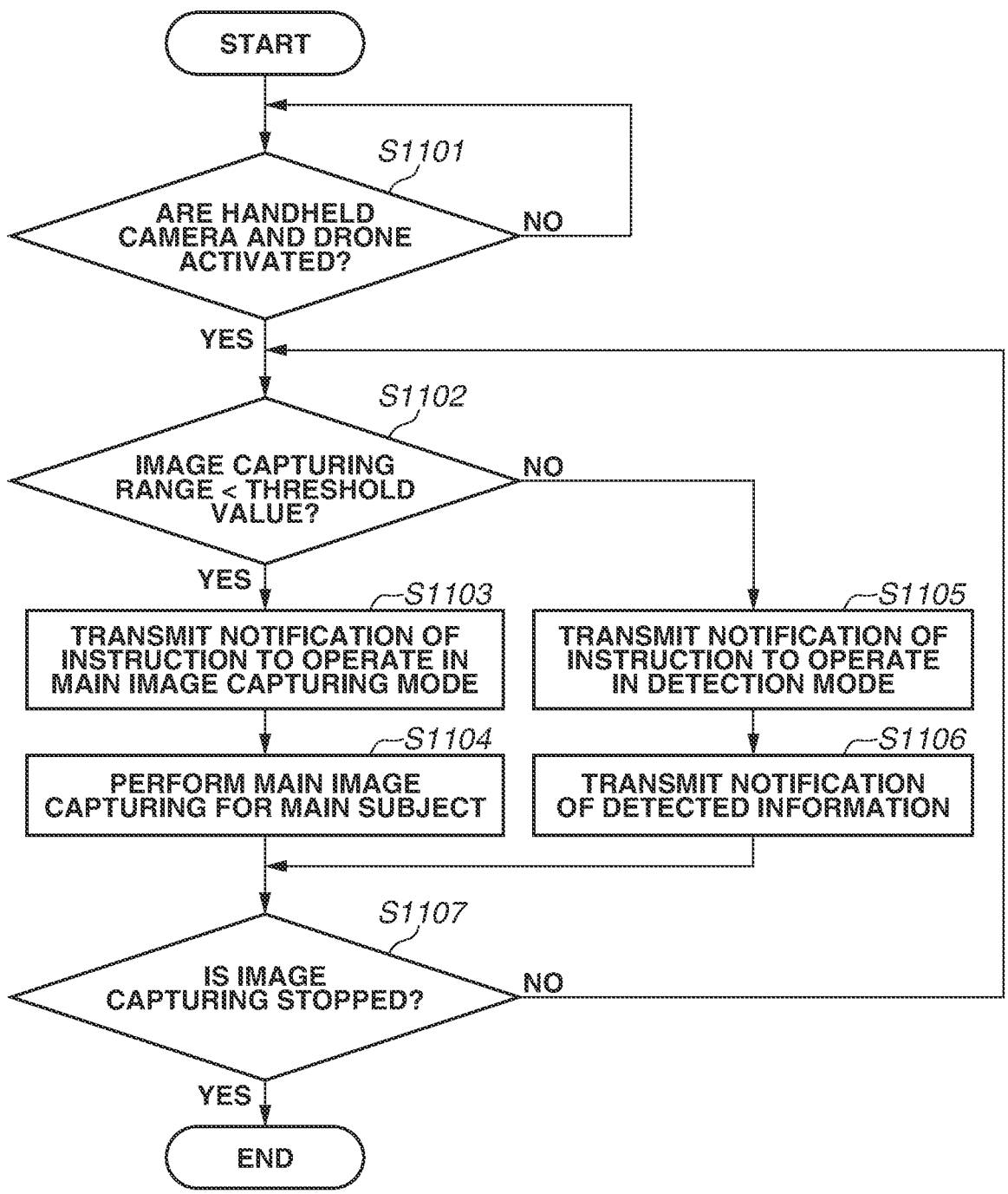
FIG. 10 is a flowchart illustrating a sequence of changing the image capture mode according to the fourth exemplary embodiment.

FIG. 10 is a flowchart illustrating a sequence of changing the image capture mode according to the fourth exemplary embodiment. The CPUs 130 and 1030 execute programs stored in the storage unit 131 and 1031, and control the components of the drone 100 and the components of the handheld camera 200 to thereby realize the process illustrated in the flowchart in FIG. 10. The flowchart illustrated in FIG. 10 starts when the drone 100 and the handheld camera 200 are turned on and start cooperating.

In step S1101, it is determined whether the handheld cameras

In step S1102, the CPU 130 compares the image capture range of the handheld camera 200 and a threshold value and determines whether the image capture range is smaller than the threshold value. At this time, the size of the image capture range is calculated from, for example, zoom information about the imaging optical unit 1011. If the image capture range is smaller than the threshold value (YES in step S1102), the process of FIG. 10 proceeds to step S1103. If the image capture range is equal to or greater than the threshold value (NO in step S1102), the process of FIG. 10 proceeds to step 1105.

In step S1103, the handheld camera 200 transmits an instruction to operate in a fourth operation mode (main image capture mode) to the drone 100.

In step S1104, the drone 100 having received the instruction information starts main image capturing. The fourth operation mode (main image capture mode) in the fourth exemplary embodiment is a mode in which the drone 100 captures an image including the same subject as the main subject captured by the handheld camera 200 as a recording image. Specifically, at the time of issuing an instruction to operate in the main image capture mode, the handheld camera 200 recognizes the subject being captured, determines the main subject, and transmits position information about the main subject to the drone 100. The drone 100 determines a main image capture region based on the position information.

In step S1105, the handheld camera 200 transmits an instruction to operate in a fifth operation mode (detection mode) to the drone 100.

In step S1106, the drone 100 having received the instruction information changes the operation mode to the fifth operation mode (detection mode). The detection mode in the fourth exemplary embodiment is a mode in which the drone 100 searches for a situation of an image capture opportunity and a subject and detects and recognizes the situation and the subject, and notifies the handheld camera 200 of the detected and recognized information, such as the direction of the area for an image capture opportunity and subject information. As used herein, the term "image capture opportunity" refers to, for example, a situation that matches a condition related to information about the movement amount or direction of the subject or a condition related to the distance from a specific subject. An image capture opportunity and subject information to be detected are determined based on the preset condition. Conditions and subject information can be held, and conditions and subject information can be added and updated as needed.

In step S1107, the CPUs 130 and 1030 determine whether the handheld camera 200 or the drone 100 stops image capturing. If the image capturing is not stopped (NO in step S1107), the process of FIG. 10 returns to step S1102. If the image capturing is stopped (YES in step S1107), the flowchart ends.

Figure 11A:
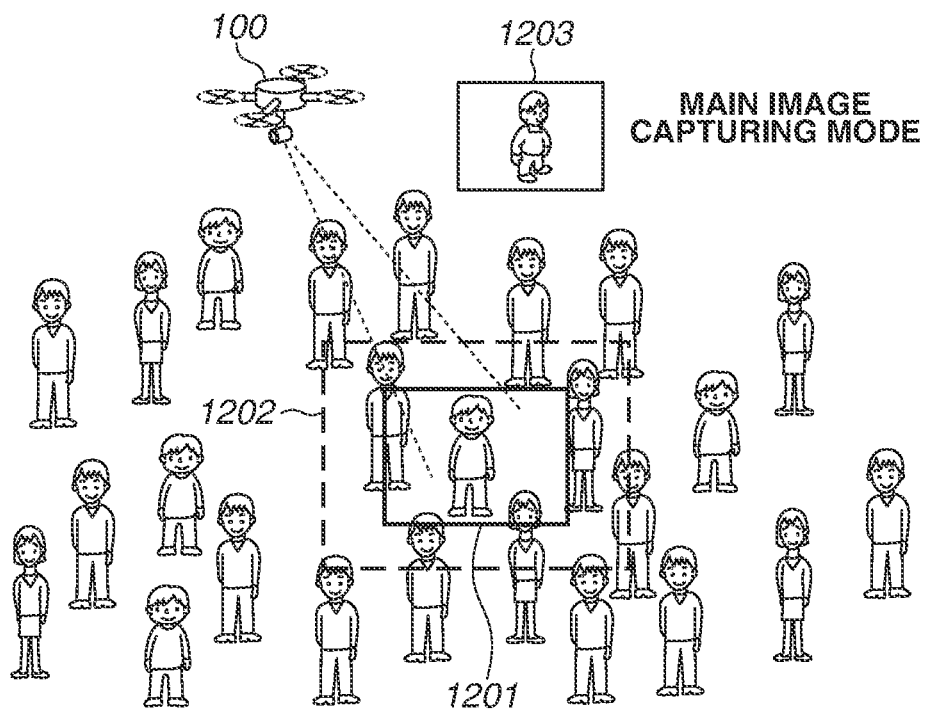
FIGS. 11A and 11B are image diagrams illustrating a change of the image capture mode according to the fourth exemplary embodiment.
Figure 11B:
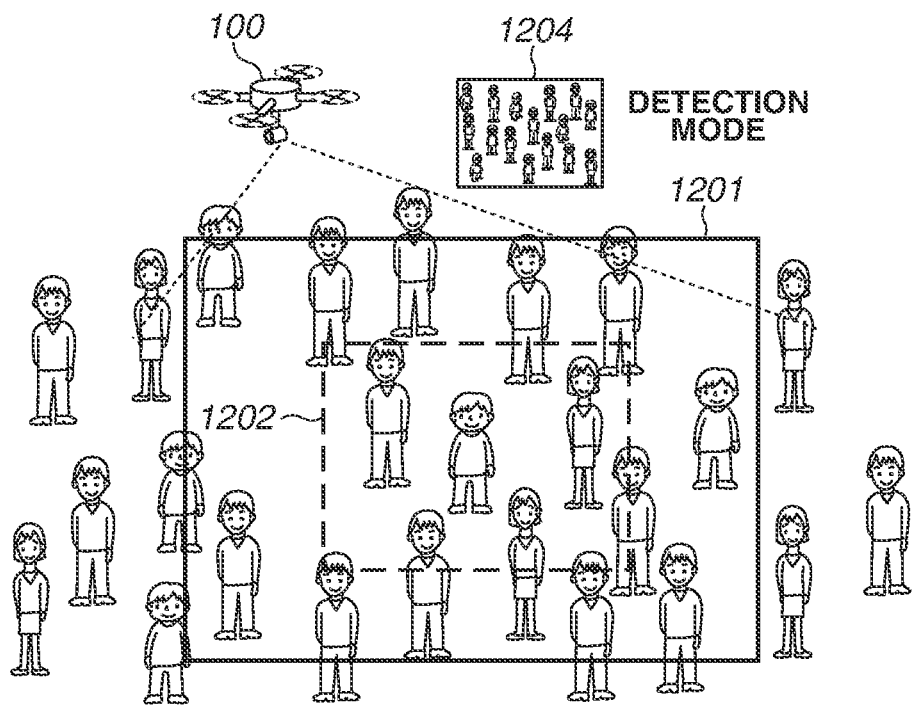

FIGS. 11A and 11B are image diagrams illustrating a change of the image capture mode according to the fourth exemplary embodiment. FIG. 11A illustrates the main image capture mode, and FIG. 11B illustrates the detection mode. A solid line frame 1201 denotes the image capture range of the handheld camera 200, and a dashed line frame 1202 denotes a threshold value frame for changing the operation mode of the drone 100. In a case where the image capture range is smaller than the threshold value frame as illustrated in FIG. 11A, the drone 100 operates in the fourth operation mode (main image capture mode) and records an image including the subject captured by the handheld camera 200 as indicated by a solid line frame 1203. In contrast, in a case where the image capture range of the handheld camera 200 is equal to or larger than the threshold value frame of the image capture range as illustrated in FIG. 11B, the drone 100 changes to the fifth operation mode (detection mode) and operates to search for a target object to be detected in a wide range as indicated by a solid line 1204.

As described above with the control according to the fourth exemplary embodiment, automatic changing between the mode for assisting the handheld camera 200 in not failing to capture an image and the mode for assisting in the detection of the image capture opportunity and the main subject is controlled based on the size of the image capture range of the handheld camera 200. In the fourth exemplary embodiment, in a case where the image capture range of the handheld camera 200 is small, it is determined that the user of the handheld camera 200 wishes to capture an image of a specific subject, and thus the drone 100 also captures an image of the same subject. In a case where the image capture range of the handheld camera 200 is wide, it is determined that the user of the handheld camera 200 is searching for a subject to be captured, and thus the drone 100 searches for and detects a specific image capture opportunity and a pre-registered subject to support the user in image capturing.

In the fourth exemplary embodiment, the image capture range is determined based on lens control information about the handheld camera 200. Alternatively, the image capture range may be determined based on the size of the subject captured by the handheld camera 200.

[Fifth Exemplary Embodiment] A fifth exemplary embodiment will be described in detail with reference to FIGS. 12, 13A, and 13B. In the fifth exemplary embodiment, the operation of the drone 100 changes between the fourth operation mode (main image capture mode) and a sixth operation mode (bird's-eye view image capture mode) based on the image capture range of the handheld camera 200. The fifth exemplary embodiment is different from the third exemplary embodiment in that the operation mode of the drone 100 changes based on the image capture range of the handheld camera 200 regardless of a determination result of the image capture opportunity and the main subject captured by the handheld camera 200. Hardware configurations of the drone 100 and the handheld camera 200 illustrated in FIGS. 2 and 3 are similar to those in the first exemplary embodiment, and thus redundant descriptions thereof are omitted.

Figure 12:
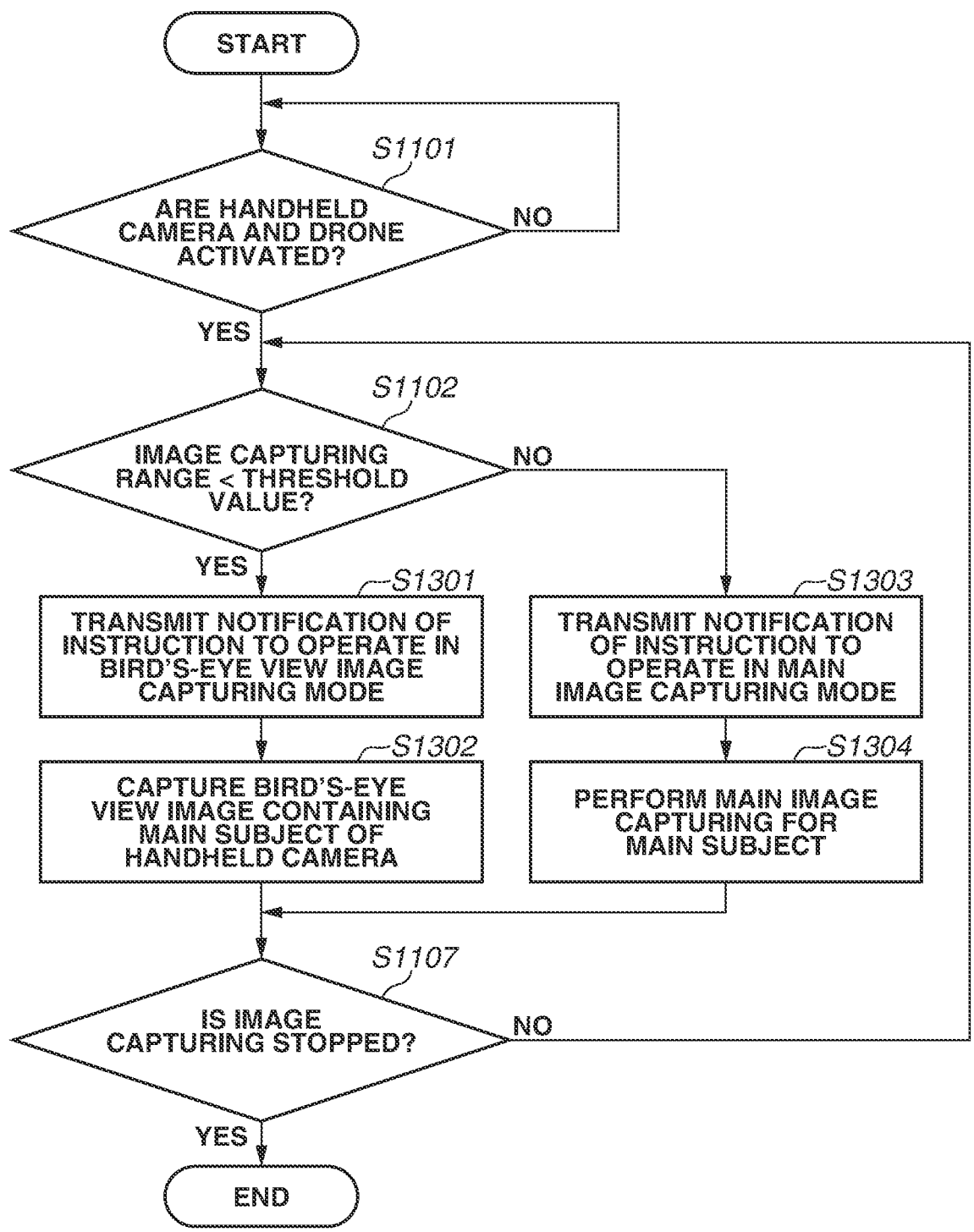
FIG. 12 is a flowchart illustrating a sequence of changing the image capture mode according to the fifth exemplary embodiment.

FIG. 12 is a flowchart illustrating a sequence of changing the image capture mode according to the fifth exemplary embodiment. Steps S1101, S1102, and S1107 are similar to those illustrated in FIG. 10, and thus redundant descriptions thereof are omitted. The CPUs 130 and 1030 execute programs stored in the storage unit 131 and 1031, and control the components of the drone 100 and the components of the handheld camera 200 to thereby realize the process illustrated in the flowchart in FIG. 12. The flowchart illustrated in FIG. 12 starts when the drone 100 and the handheld camera 200 are turned on and start cooperating. In step S1102 in the flowchart, if it is determined that the image capture range of the handheld camera 200 is less than the threshold value (YES in step S1102), the process of FIG. 12 proceeds to step S1301.

In the case where the image capture range of the handheld camera 200 is less than the threshold value (YES in step S1102), in step S1301, the handheld camera 200 transmits an instruction to operate in the sixth operation mode (bird's-eye view image capture mode) to the drone 100.

In step S1302, the drone 100 having received the instruction information is changed to the sixth operation mode (bird's-eye view image capture mode). The bird's-eye view image capture mode in the fifth exemplary embodiment is a mode in which the drone 100 captures an image of a wider range than the image capture range of the handheld camera 200 that includes the same subject as the subject captured by the handheld camera 200 as a recording image.

If the image capture range of the handheld camera 200 is equal to or greater than the threshold value (NO in step S1102), in step S1303, the handheld camera 200 transmits an instruction to operate in the fourth operation mode (main image capture mode) to the drone 100.

In step S1304, the drone 100 having received the instruction information starts image capturing in the fourth operation mode (main image capture mode). The main image capture mode in the fifth exemplary embodiment is, for example, a mode of capturing an image of a specific subject in a predetermined condition such as an angle of view, e.g., zoom-up image capturing. For example, a subject with respect to the handheld camera 200 or a pre-registered main subject are sequentially enlarged, and images thereof are captured.

Figure 13A:
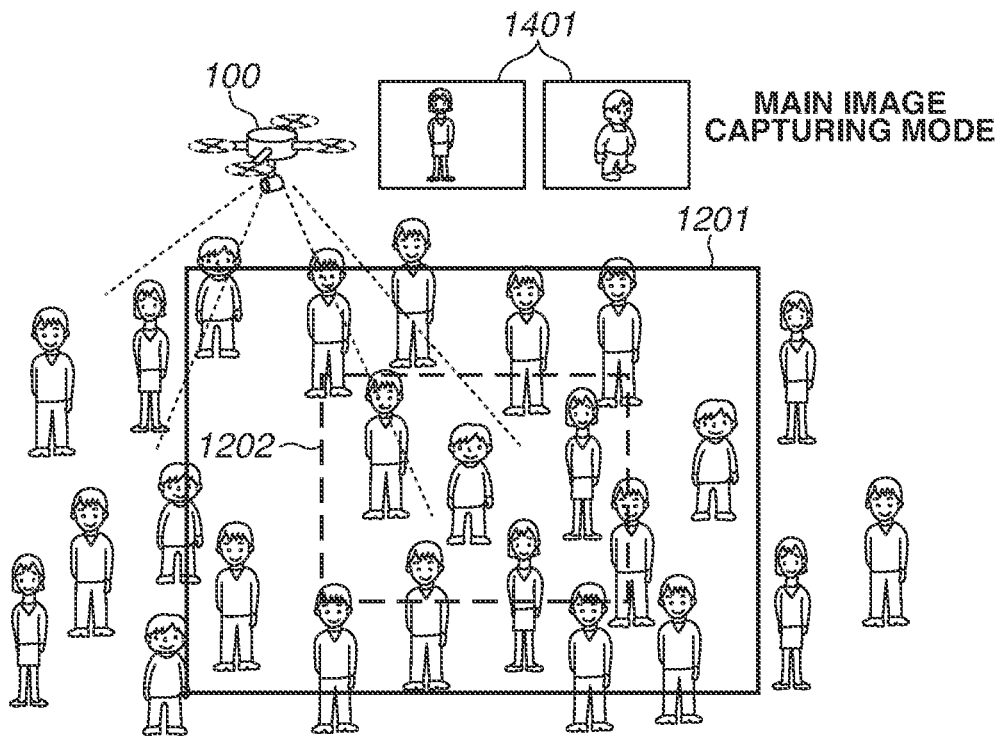
FIGS. 13A and 13B are image diagrams illustrating a change of the image capture mode according to the fifth exemplary embodiment.
Figure 13B:
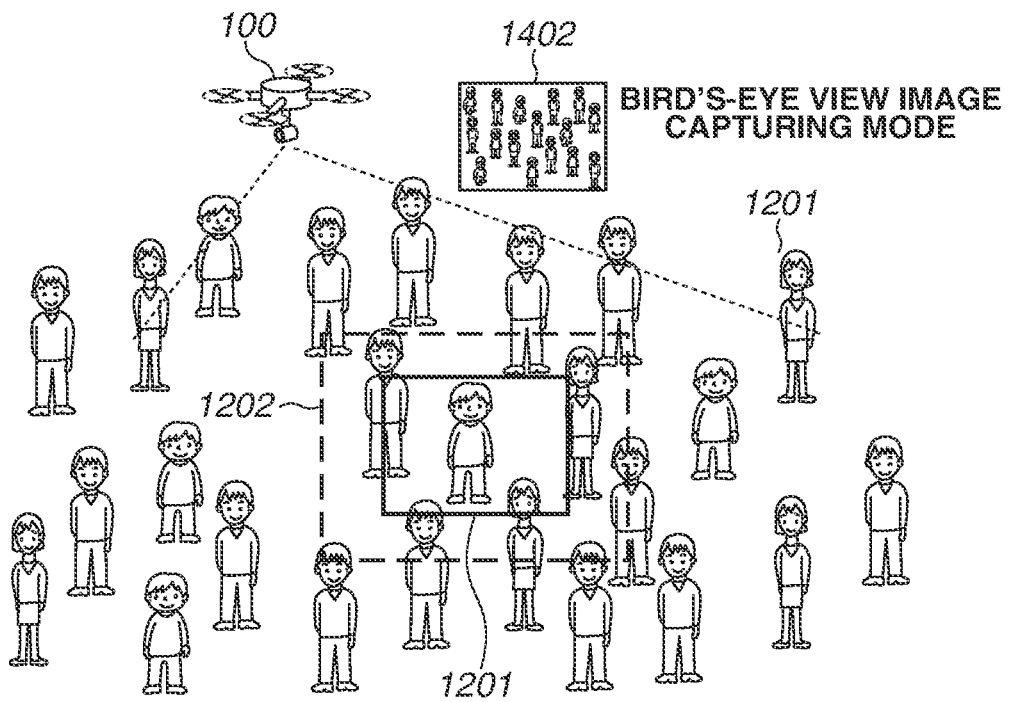

FIGS. 13A and 13B are image diagrams illustrating a change of the image capture mode according to the fifth exemplary embodiment. FIG. 13A illustrates the main image capture mode, and FIG. 13B illustrates the bird's-eye view image capture mode. In a case where the image capture range is wider than the threshold value frame indicated by the dashed line frame 1202 as illustrated in FIG. 13A, the drone 100 operates in the fourth operation mode (main image capture mode). Specifically, the drone 100 operates to record an image including the main subject captured by the handheld camera 200 as indicated by solid line frames 1401 or an image including the main subject registered in advance in the drone 100.

In contrast, in a case where the image capture range of the handheld camera 200 is smaller than the threshold value frame indicated by the dashed line frame 1202 as illustrated in FIG. 13B, the drone 100 operates in the sixth operation mode (bird's-eye view image capture mode). As indicated by a solid line frame 1402, the drone 100 operates to record an image of a wider range than the image capture range of the handheld camera 200 that includes the subjects captured by the handheld camera 200.

As described above, with the control according to the fifth exemplary embodiment, the assistance in not missing an image capture opportunity and the simultaneous capturing of images of a wide region and a small region are automatically controlled based on the image capture state of the handheld camera 200. In the fifth exemplary embodiment, in a case where the image capture range of the handheld camera 200 is small, the user of the handheld camera 200 captures an image of a zoom-up specific subject, and thus the drone 100 captures a wide-angle image even including the periphery of the same subject. In contrast, in a case where the image capture range of the handheld camera 200 is wide, the handheld camera 200 cannot capture an enlarged image of the specific subject. The image capturing by the user is therefore supported by the drone 100 zooming in and capture an image of a subject included in the shooting angle of view of the handheld camera 200 and a pre-registered main subject.

While the first to fifth exemplary embodiments are described above, which one of the settings of changing the operation mode according to the above-described exemplary embodiments is to be used in a system in which cameras including a camera capable of autonomously capturing an image cooperates to capture images can be preset.

For example, in a case where the user wishes to capture an image of an entire range while capturing an image without missing the main subject, the change setting according to the first exemplary embodiment is enabled. In a case where each camera is to capture an image basically freely, the change setting according to the third exemplary embodiment is enabled to receive a notification if the other camera detects an image capture opportunity.

In a case where the user does not pre-register the main subject and wishes to not miss as many image capture opportunities other than an image of the subject captured by the handheld camera 200 as possible at different times, the change setting according to the fourth exemplary embodiment is enabled. In a case where an image of each of subjects captured by the handheld camera 200 is to be captured as a main theme at different times, the change setting according to the fifth exemplary embodiment is enabled.

Furthermore, according to the second exemplary embodiment, a camera capable of autonomously capturing an image can be forced to capture an image of a main subject by a user operation regardless of the change setting.

In the exemplary embodiments described above, the drone 100 and the handheld camera 200 cooperate and capture images. However, the image capture apparatuses do not have to be a drone and a handheld camera. Furthermore, in the exemplary embodiments described above, two image capture apparatuses the drone 100 and the handheld camera 200 cooperate and capture images. However, three or more image capture apparatuses can cooperate and capture images.

Each handheld camera 200 described in the exemplary embodiments is applicable to a digital still camera, a digital video camera, or a smartphone capable of capturing images.

[Sixth Exemplary Embodiment] At least one of the various functions, processes, or methods described in the exemplary embodiments can be realized using a program. In a sixth exemplary embodiment, the program for realizing at least one of the various functions, processes, or methods described in the exemplary embodiments will be referred to as "program X". Furthermore, in the sixth exemplary embodiment, a computer for executing the program X will be referred to as a "computer Y". A Personal computer, a micro-computer, or a central processing unit (CPU) are examples of the computer Y.

At least one of the various functions, processes, or methods described in the exemplary embodiments can be realized by the computer Y by executing the program X. In this case, the program X is provided to the computer Y via a computer-readable storage medium. The computer-readable storage medium according to the sixth exemplary embodiment includes at least one of a hard disk apparatus, a magnetic storage apparatus, an optical storage apparatus, a magneto-optical storage apparatus, a memory card, a read-only memory (ROM), or a random access memory (RAM). Further, the computer-readable storage medium according to the sixth exemplary embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-086426, filed May 18, 2020, which is hereby incorporated by reference herein in its entirety.

What is claimed is:

1. An unmanned image capture apparatus that can fly without a person comprising:
   a motor for rotating a rotor;
    an image capture unit including an image sensor;

a communication interface that receives subject information about a subject captured by an external image capture apparatus; and a controller that controls the unmanned image capture apparatus based on a first operation mode in a case where the subject information does not include information about a main subject, or based on a second operation mode in a case where the subject information includes the information about the main subject, wherein the first operation mode is an operation mode of searching for the main subject by moving a position of the unmanned image capture apparatus, and the second operation mode is an operation mode of capturing an image of the subject at an angle of view that is different from an angle of view of the external image capture apparatus wherein the external image capture apparatus is a handheld camera, and wherein, in response to the main subject having been found in the first operation mode, and the communication interface transmits the position information to the handheld camera.

2. The unmanned image capture apparatus according to claim 1, further comprising a recording unit that records the image captured at the angle of view that is different from the angle of view of the external image capture apparatus in a recording medium in the second operation mode, wherein the recording unit is implemented by one or more processors, circuitry or a combination thereof.

3. The unmanned image capture apparatus according to claim 1, wherein the handheld camera displays, on a display panel of the handheld camera, an icon specifying a location of the main subject based on the position information.

4. The image capture apparatus according to claim 1, further comprising a recording unit that records an image captured by the image capture unit in a recording medium, wherein in response to the search for the main subject being performed in the first operation mode and the main subject is detected from an image captured by the image capture unit, the recording unit records the image in the recording medium.

5. The image capture apparatus according to claim 4, wherein response to the search for the main subject being performed in the first operation mode and the main subject is detected from an image captured by the image capture unit, position information about the main subject is transmitted to the external apparatus.

6. The unmanned image capture apparatus according to claim 1, wherein, in response to an image capture range of the handheld camera being wider than a threshold value, the controller performs control to cause the image capture unit to capture an image in a range narrower than the image capture range, and in response to the image capture range being narrower than the threshold value, the controller performs control to cause the image capture unit to capture an image in a range wider than the image capture range.

7. The unmanned image capture apparatus according to claim 6, wherein the handheld camera includes a zoom lens, and wherein the image capture range is acquired based on zoom information about the zoom lens.

8. The image capture apparatus according to claim 1, further comprising a view changing unit that changes an angle of view at which the image capture unit performs image capturing, wherein in response to the search for the main subject being performed in the first operation mode and the main subject is detected from an image captured by the image capture unit, the view changing unit changes an angle of view at which the image capture unit performs image capturing for the main subject based on a preset image capture condition, and the image capture unit captures an image of the main subject at the angle of view that is changed by the view changing unit; and wherein the view changing unit is implemented by one or more processors, circuitry or a combination thereof.

9. The image capture apparatus according to claim 8, further comprising:

a detection unit that detects a motion vector from the image captured by the image capture unit; and a determination unit that determines a position of the main subject from the motion vector, wherein the view changing unit changes the angle of view at which the image capture unit performs image capturing based on the position of the main subject that is determined by the determination unit in the first operation mode; and wherein the view changing unit, the detection unit, and the determination unit are implemented by one or more processors, circuitry or a combination thereof.

10. The image capture apparatus according to claim 8, wherein in the second operation mode, the view changing unit changes the angle of view at which the image capture unit performs image capturing to the angle of view that is different from the angle of view of the external apparatus based on the subject information and the preset image capture condition, and wherein the image capture unit performs image capturing at the angle of view that is changed by the view changing unit.

11. The image capture apparatus according to claim 8, wherein the view changing unit changes the angle of view at which the image capture unit performs image capturing such that the image capture unit captures the image of the main subject from a direction different from an image capturing direction of the external apparatus and the captured image includes the main subject captured by the external apparatus in the second operation mode.

12. The image capture apparatus according to claim 8, wherein the view changing unit changes the angle of view at which the image capture unit performs image capturing such that the image capture unit captures an image of a subject different from the main subject captured by the external apparatus in the second operation mode.

13. A method for controlling an unmanned image capture apparatus that can fly without a person, the method comprising: receiving subject information about a subject captured by an external image capture apparatus; and controlling the unmanned image capture apparatus based on a first operation mode in a case where the subject information does not include information about a main subject, or based on a second operation mode in a case where the subject information includes the information about the main subject, wherein the first operation mode is an operation mode of searching for the main subject by moving a position of the unmanned image capture apparatus, and the second operation mode is an operation mode of capturing an image of the subject at an angle of view that is different from an angle of view of the external image capture apparatus, wherein the external image capture apparatus is a handheld camera, and wherein, in response to the main subject having been found in the first operation mode, the controller acquires position information about the main subject, and the communication interface transmits the position information to the handheld camera.

14. A non-transitory storage medium that stores a program causing a computer to execute a method for controlling an unmanned image capture apparatus that can fly without a person, the method comprising: receiving subject information about a subject captured by an external image capture apparatus; and controlling the unmanned image capture apparatus based on a first operation mode in a case where the subject information does not include information about a main subject, or based on a second operation mode in a case where the subject information includes the information about the main subject, wherein the first operation mode is an operation mode of searching for the main subject by moving a position of the unmanned image capture apparatus, and the second operation mode is an operation mode of capturing an image of the subject at an angle of view that is different from an angle of view of the external image capture apparatus, wherein the external image capture apparatus is a handheld camera, and wherein, in response to the main subject having been found in the first operation mode, the controller acquires position information about the main subject, and the communication interface transmits the position information to the handheld camera.

\* \* \* \* \*